(12) United States Patent
Fujimoto et al.

(10) Patent No.: US 8,594,892 B2
(45) Date of Patent: Nov. 26, 2013

(54) ELECTRIC POWER STEERING APPARATUS FOR VEHICLE

(75) Inventors: Masaki Fujimoto, Toyota (JP); Eiji Kasai, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 75 days.

(21) Appl. No.: 13/500,327

(22) PCT Filed: Oct. 21, 2009

(86) PCT No.: PCT/JP2009/068443
§ 371 (c)(1),
(2), (4) Date: Apr. 5, 2012

(87) PCT Pub. No.: WO2011/048702
PCT Pub. Date: Apr. 28, 2011

(65) Prior Publication Data
US 2012/0197493 A1    Aug. 2, 2012

(51) Int. Cl.
*B62D 6/00*    (2006.01)
*B62D 5/04*    (2006.01)

(52) U.S. Cl.
USPC .................................. 701/42; 703/2; 180/446

(58) Field of Classification Search
USPC ............ 701/41, 42; 703/2; 180/443, 444, 446
See application file for complete search history.

(56) References Cited

U.S. PATENT DOCUMENTS

| 5,207,239 | A  | * | 5/1993  | Schwitalla | ............... | 251/129.09 |
| 7,604,088 | B2 | * | 10/2009 | Nishizaki et al. | ............. | 180/446 |
| 2002/0179362 | A1 | * | 12/2002 | Norman et al. | ............... | 180/446 |
| 2006/0070794 | A1 | * | 4/2006 | Fujita et al. | .................... | 180/446 |
| 2006/0086560 | A1 | * | 4/2006 | Furusho et al. | ................ | 180/446 |
| 2008/0201041 | A1 | * | 8/2008 | Jiang | ................................ | 701/42 |
| 2011/0036660 | A1 | * | 2/2011 | Kojo et al. | ..................... | 180/446 |

FOREIGN PATENT DOCUMENTS

| JP | 11 78924 | 3/1999 |
| JP | 11 180330 | 7/1999 |

(Continued)

OTHER PUBLICATIONS

Lianbing et al, Study on Fail-Safe Strategy of Electric Power Steering System, ICMA 2009 International Conference on Mechatronics and Automation, 2009, pp. 4775-4779.*

(Continued)

*Primary Examiner* — Russell Frejd
(74) *Attorney, Agent, or Firm* — Oblon, Spivak, McClelland, Maier & Neustadt, L.L.P.

(57) ABSTRACT

A steering angle estimation section calculates a front-wheel-side estimative steering angle and a rear-wheel-side estimative steering angle through use of wheel speeds of respective wheels, and averages these steering angles to thereby obtain an accurate estimative steering angle. It also calculates an estimative steering angle difference between the steering angles. An axial force estimation section calculates a base axial force through use of the estimative steering angle and a vehicle speed, and calculates a correction axial force which applies an axial force difference (hysteresis) to the base axial force in accordance with a turning or returning operation by a driver. The axial force estimation section adds the base axial force and the correction axial force together to thereby calculate an accurate estimative axial force. An assist computation section compares a target steering torque, which changes with the vehicle speed, and the accurate estimative axial force, and subtracts the target steering torque from the estimative axial force, to thereby calculate an assist torque.

13 Claims, 18 Drawing Sheets

(56) References Cited

FOREIGN PATENT DOCUMENTS

| | | |
|---|---|---|
| JP | 2000 185660 | 7/2000 |
| JP | 2001 106099 | 4/2001 |
| JP | 2005 67262 | 3/2005 |
| JP | 2005 98827 | 4/2005 |
| JP | 2008 213709 | 9/2008 |
| JP | 2008 249719 | 10/2008 |
| JP | 2009 6985 | 1/2009 |
| JP | 2009 12511 | 1/2009 |

OTHER PUBLICATIONS

Morita et al, Improvement of Steering Feel of Electric-Power Steering System with Variable Gear Transmission System Using Decoupling Method, 10th IEEE International Workshop on Advanced Motion Control, 2008, pp. 417-422.*

Hu et al, Design of Control Logic and Compensation Strategy for Electric Power Steering Systems, IEEE, Vehicle Power and Propulsion Conference, 2008, pp. 1-6.*

International Search Report issued on Mar. 2, 2010 in PCT/JP09/068443 filed on Oct. 21, 2009.

* cited by examiner

ELECTRIC POWER STEERING APPARATUS FOR VEHICLE

TECHNICAL FIELD

The present invention relates to an electric power steering apparatus for a vehicle which includes an electric motor for applying assist force to rotation operation of a steering wheel. In particular, the present invention relates to an electric power steering apparatus which continues application of a proper assist force even in the case where an anomaly occurs in operation force detection means which detects an operation force applied by a driver through rotation operation of the steering wheel.

BACKGROUND ART

An electric power steering apparatus is configured to detect an operation force by use of operation force detection means, and control an electric motor on the basis of the detected operation force so as to apply an assist force. In general, such an electric power steering apparatus has a fail-safe mechanism for quickly decreasing the assist force and stopping the electric motor, from the viewpoint of preventing erroneous output (application of assist force) which would otherwise occur when an anomaly occurs in the operation force detection means. However, if an anomaly occurs in the operation force detection means when the vehicle is traveling and application of assist force is stopped, the burden imposed on a driver when turning the steering wheel increases. Accordingly, it has been desired to configure the electric power steering apparatus such that, even when an anomaly occurs in the operation force detection means, the electric power steering apparatus operates the electric motor so as to continue the application of assist force to a possible extent.

Therefore, such an electric power steering apparatus that can continue application of assist force even when an anomaly occurs in the operation force detection means has been actively studied and proposed. For example, Japanese Patent Application Laid-Open (kokai) No. 2009-6985 discloses an electric power steering apparatus which continues generation of steering assist force in consideration of reaction from a road surface. This conventional electric power steering apparatus includes steering torque detection means for detecting a steering torque input to a steering system, and first torque command value computation means for computing a steering assist torque command value on the basis of the steering torque detected by the steering torque detection means. Also, this conventional electric power steering apparatus includes self-aligning estimation means for estimating a self-aligning torque transmitted from the road surface to a steering mechanism, and second torque command value computation means for computing a steering assist torque command value on the basis of the estimated self-aligning torque. The self-aligning estimation means can estimate the self-aligning torque on the basis of the steering angle of a steering mechanism, which can be calculated on the basis of the speeds of the front-side left and right wheels of the vehicle.

In this conventional electric power steering apparatus, when torque detection section anomaly detection means detects an anomaly of the steering torque detection means, the second torque command value computation means is used in place of the first torque command value computation means. Then, generation of steering assist torque is continued through use of the steering assist torque command value computed by the second torque command value computation means.

As to detection of steering angle through use of wheel speeds, for example, Japanese Patent Application Laid-Open (kokai) No. 2005-98827 discloses a steering angle estimation apparatus for a vehicle in which rotational speeds of the four wheels of the vehicle are received from wheel rotational speed sensors provided for the four wheels; slippage of the four wheels is detected through comparison of the relation in wheel rotational speed between respective two wheels (front-side two wheels, rear-side two wheels, left-side two wheels, and right-side two wheels); and the steering angle is estimated through use of the wheel rotational speeds of the wheels other than the wheel which is slipping.

Also, for example, Japanese Patent Application Laid-Open (kokai) No. 2008-249719 discloses a steering angle estimation apparatus for a vehicle in which rotational speeds of the four wheels of the vehicle are received from wheel rotational speed sensors provided for the four wheels of the vehicle; slippage of the four wheels is detected through comparison among the rotational speed ratio between front-side left and right wheels, that between rear-side left and right wheels, that between the right-side front and rear wheels, and that between the left-side front and rear wheels; and the steering angle is estimated through use of the rotational speed ratios obtained by excluding the wheel which is slipping.

Also, for example, Japanese Patent Application Laid-Open (kokai) No. H11-78924 discloses an electronic power steering apparatus which stably supplies steering assist force to a steering system even when a steering torque sensor fails. This conventional electric power steering apparatus includes two steering torque detection means each composed of a steering torque sensor and a steering torque detector including a torque signal detector and failure detection means. In this conventional electric power steering apparatus, one steering torque detection means is switched to the other steering torque detection means in response to a failure signal from the failure detection means so as to continue the operation of the apparatus, to thereby enable the steering assist force to be supplied to the steering system on the basis of accurate steering torque.

DISCLOSURE OF THE INVENTION

Incidentally, in order to continue application of assist force even after occurrence of an anomaly in operation force detection means, it is necessary to accurately detect or estimate a resisting force against an operation force applied by a driver via a steering wheel; i.e., a reaction force transmitted from a road surface via steerable wheels. It is also necessary to determine and apply the assist force through use of the accurately detected or estimated reaction force.

In this regard, in the electric power steering apparatus disclosed in the above-mentioned Japanese Patent Application Laid-Open No. 2009-6985, self-aligning torque transmitted as a reaction force is estimated on the basis of the steering angle and the coefficient of friction of the road surface. In this case, since the self-aligning torque changes while having great dependency on the coefficient of friction of the road surface, the coefficient of friction of the road surface must be detected or estimated accurately. Therefore, a separate sensor must be provided on the vehicle.

Also, in the case where such self-aligning torque is estimated on the basis of the steering angle, the steering angle must be detected or estimated accurately. In the electric power steering apparatus disclosed in the above-mentioned Japanese Patent Application Laid-Open No. 2009-6985, the steering angle is calculated from the speeds of the front-side left and right wheels. However, in the case where the steering angle is calculated from the speeds of the front-side left and right wheels, the steering angle cannot be calculated accurately unless the rotating state of each wheel is taken into consideration.

In this regard, when either of the vehicular steering angle estimation apparatuses disclosed in the Japanese Patent Application Laid-Open Nos. 2005-98827 and 2008-249719 is employed, slippage occurring at a wheel, which is the rotating state of the wheel, can be taken into consideration, and an accurate steering angle can be calculated. However, the vehicular steering angle estimation apparatuses disclosed in the Japanese Patent Application Laid-Open Nos. 2005-98827 and 2008-249719 estimate the steering angle in accordance with the following Eqs. (1) and (2) on the basis of the well known Ackermann Jeantaud theory, which stands among the front-side left and right wheels and the rear-side left and right wheels of a vehicle as shown in FIG. 18 when the vehicle turns. Specifically, a steering angle $\theta Fr$ is estimated as a steering angle of steerable wheels determined through use of wheel speeds $\omega fL$ and $\omega fR$ of the front-side left and right wheels, and a steering angle $\theta Rr$ is estimated as a steering angle of the steerable wheels determined through use of wheel speeds $\omega rL$ and $\omega rR$ of the rear-side left and right wheels.

$$\theta Fr = \frac{1}{2}\arcsin\left\{\frac{4L}{W} \times \left(\frac{\omega fL - \omega fR}{\omega fL + \omega fR}\right)\right\} \qquad \text{Eq. (1)}$$

$$\theta Rr = \arctan\left\{\frac{2L}{W} \times \left(\frac{\omega rL - \omega rR}{\omega rL + \omega rR}\right)\right\} \qquad \text{Eq. (2)}$$

In Eqs. (1) and (2), L represents the wheel base of a vehicle, and W represents the tread width of the vehicle.

Incidentally, in order that the Ackermann Jeantaud theory stands, when the vehicle is turning, the Ackermann angle $\alpha R$ of an inner steerable wheel, which is located closer to the turning center of the vehicle than the other (outer) steerable wheel, must be larger than the Ackermann angle $\alpha L$ of the outer steerable wheel as shown in FIG. 18. Also, a so-called Ackermann ratio (the ratio between the between the Ackermann angle $\alpha R$ of the inner steerable wheel and the Ackermann angle $\alpha L$ of the outer steerable wheel) must be maintained constant.

However, it has been said that, in general, when the steerable wheels are steered to the vicinity of the maximum steering angle, the Ackermann ratio decreases due to the suspension geometry characteristic of the vehicle. Therefore, in the case where the front-side wheels are steerable wheels, the estimation accuracy of the steering angle $\theta Fr$ estimated in accordance with the above-mentioned Eq. (1) becomes poor, in particular, in the vicinity of the maximum steering angle. Also, in general, the rear wheels, which are not steered, move along a turning circle while being dragged as a result of the turning of the vehicle. Therefore, in the case where the steering angle $\theta Rr$ is estimated or calculated in accordance with the above-mentioned Eq. (2) without consideration of such behavior of the rear wheels, the estimation accuracy becomes poor. If the estimation accuracy of the steering angle $\theta Fr$ and the steering angle $\theta Rr$ deteriorates, the estimation accuracy of the reaction force (self-aligning torque), which is estimated through use of the steering angle $\theta Fr$ or the steering angle $\theta Rr$ also deteriorates. As a result, application of proper assist force becomes difficult.

Meanwhile, in the case where a redundant system is formed through use of a plurality of operation force detection means (steering torque detection means) as in the case of the electric power steering apparatus disclosed in the Japanese Patent Application Laid-Open No. H11-78924, proper assist force can be applied all times. However, in this case, a plurality of operation force detection means (steering torque detection means) must be installed on the vehicle, which is not preferred from the viewpoint of installation space or cost.

The present invention has been accomplished in order to solve the above-described problems, and its object is to provide an electric power steering apparatus for a vehicle which accurately determines a proper assist force through use of a simplified configuration and continuously applies the determined assist force even when an anomaly occurs in operation force detection means.

In order to achieve the above-described object, the present invention provides an electric power steering apparatus for a vehicle which includes operation force detection means for detecting operation force which is input by a driver so as to steer steerable wheels of the vehicle through rotation operation of a steering wheel; an electric motor for generating assist force so as to assist the rotation operation of the steering wheel by the driver; and control means for controlling operation of the electric motor on the basis of an assist force corresponding to the operation force detected by the operation force detection means, the control means comprising: vehicle speed detection means for detecting speed of the vehicle; wheel speed detection means provided for each of front-side left and right wheels and rear-side left and right wheels of the vehicle for detecting speed of the corresponding wheel; anomaly detection means for detecting an anomaly of the operation force detection means; steering angle estimation means, operable when the anomaly detection means has detected an anomaly of the operation force detection means, for computing a first steering angle of the steerable wheels through use of the speeds of the front-side left and right wheels among those detected by the wheel speed detection means, computing a second steering angle of the steerable wheels through use of the speeds of the rear-side left and right wheels among those detected by the wheel speed detection means, and estimating the steering angle of the steerable wheels at the time when the vehicle is turning, through use of the first and second steering angles; axial force estimation means for estimating an axial force through use of the steering angle estimated by the steering angle estimation means and the vehicle speed detected by the vehicle speed detection means, the axial force having a predetermined relation with the steering angle of the steerable wheels and the vehicle speed, and being input to a steering mechanism which steers the steerable wheels of the vehicle; assist force computation means for determining a target steering force through use of the vehicle speed detected by the vehicle speed detection means, the target steering force having a predetermined relation with the vehicle speed and being input by the driver via the steering wheel, and for computing the assist force for assisting the rotation operation of the steering wheel by the driver, through use of the determined target steering force and the axial force estimated by the axial force estimation means; and operation control means for controlling operation of the electric motor on the basis of the assist force computed by the assist force computation means.

By virtue of this configuration, when an anomaly of the operation force detection means is detected by the anomaly detection means, the steering angle estimation means can compute a first steering angle of the steerable wheels through use of the speeds of the front-side left and right wheels, and can compute a second steering angle of the steerable wheels through use of the speeds of the rear-side left and right wheels. Thus, the steering angle estimation means can estimate the steering angle of the steerable wheels at the time when the vehicle is turning, through use of the computed first and second steering angles. Therefore, even in the case where the steering angle of the steerable wheels is estimated on the basis of, for example, the above-mentioned Ackermann Jeantaud theory, it is possible to restrain deterioration of the estimation accuracy due to a decrease in the Ackermann ratio on the front wheel side (steerable wheel side) and deterioration of the estimation accuracy due to occurrence of dragging at the rear wheel side. Also, since the first steering angle and the second steering angle are used, there can be formed a robust redundant system in which estimation of the steering angle of the steerable wheels is less likely to be affected by anomaly of any one of the speeds of the wheels detected by the wheel speed detection means. Accordingly, the steering angle estimation means can accurately estimate the steering angle of the steerable wheels.

Since the steering angle estimation means can accurately estimate the steering angle of the steerable wheels, a steering angle sensor for detecting the steering angle of the steerable wheels becomes unnecessary. Thus, securing an installation space becomes unnecessary, and cost can be reduced greatly. Also, even in a vehicle which does not include a steering angle sensor, the electric power steering apparatus can be operated continuously even after an anomaly has occurred in the operation force detection means.

Also, the axial force estimation means can accurately estimate the axial force input to the steering mechanism through use of the steering angle of the steerable wheels accurately estimated by the steering angle estimation means. Furthermore, the assist force computation means can compute the assist force, which assists the rotation operation of the steering wheel by the driver, through use of the target steering force determined on the basis of the vehicle speed and the axial force accurately estimated by the axial force estimation means.

Accordingly, even when an anomaly occurs in the operation force detection means, it is possible to determine the assist force by accurately estimating the steering angle of the steerable wheels and the axial force input to the steering mechanism, and continue application of a proper assist force for assisting the rotation operation of the steering wheel by the driver. Thus, the burden imposed on the driver when rotating the steering wheel can be reduced greatly.

In this case, preferably, the control means includes operation speed detection means for detecting a rotational operation speed of the steering wheel; and the steering angle estimation means includes filter processing means for performing low-pass filter processing for the speeds of the wheels detected by the wheel speed detection means, the low-pass filter processing having a predetermined cutoff frequency, wherein the filter processing means performs the low-pass filter processing for the speeds of the wheels detected by the wheel speed detection means, while increasing the cutoff frequency as the rotational operation speed detected by the operation speed detection means increases, and decreasing the cutoff frequency as the detected rotational operation speed decreases. In this case, preferably, the operation speed detection means detects a rotational speed of the electric motor, and detects the rotational operation speed of the steering wheel from the detected rotational speed of the electric motor.

By virtue of these configurations, the filter processing section can perform low-pass filter processing for the speeds of the wheels detected by the wheel speed detection means. Thus, it becomes possible to remove noise components from signals which are output from the wheel speed detection means and represent the speeds of the wheels. Thus, the computation accuracy of the first steering angle, the second steering angle, and the steering angle of the steerable wheels, which are computed by the steering angle estimation means, can be improved further.

Also, the filter processing section can change the cutoff frequency used for the low-pass filter processing in accordance with the rotational operation speed of the steering wheel detected by the operation speed detection means. That is, the filter processing section can change the cutoff frequency to a higher frequency when the detected rotational operation speed increases; in other words, the driver rotates the steering wheel quickly; and change the cutoff frequency to a lower frequency when the detected rotational operation speed decreases; in other words, the driver rotates the steering wheel slowly.

This configuration effectively prevents phase delay of the signals caused by the low-pass filter processing in particular when the rotational operation speed is high. Accordingly, the steering angle estimation means can compute the first steering angle and the second steering angle without any delay, and can improve the computation accuracy. Thus, the axial force estimation section can estimate the axial force quickly, and the assist force computation means can compute the assist force quickly. As a result, it is possible to apply the assist force without any delay in relation to the rotation operation of the steering wheel by the driver; that is, while securing good flow-up performance.

Moreover, in the case where the speed of the rotation operation of the steering wheel by the driver is detected through use of the rotational speed of the electric motor, which rotates in synchronism with the rotation operation of the steering wheel, the rotational operation speed of the steering wheel can be detected by a simplified configuration without use of an additional sensor. Thus, cost can be lowered.

In these cases, the steering angle estimation means can compute the first and second steering angles of the steerable wheels through use of an overall gear ratio of the vehicle, which represents the ratio of the detected steering angle to the actual steering angle of the steerable wheels of the vehicle and which is set in advance through an experiment.

By virtue of the first and second steering angles being computed through use of the overall gear ratio of the vehicle, computation errors of the first and second steering angles stemming, for example, from the suspension geometry characteristic can be reduced. That is, since the overall gear ratio of the vehicle is used, even in the case where the steering angle of the steerable wheels is estimated on the basis of the above-mentioned Ackermann Jeantaud theory, it becomes possible to further restrain deterioration of the estimation accuracy stemming from a decrease in the Ackermann ratio on the front wheel side (steerable wheel side) and occurrence of dragging on the rear wheel side. Accordingly, the steering angle estimation means can accurately estimate the steering angle of the steerable wheels.

In these cases, the steering angle estimation means may estimate the steering angle of the steerable wheels at the time when the vehicle is turning by averaging a first steering angle of the steerable wheels computed through use of a difference between the speeds of the front-side left and right wheels among those detected by the wheel speed detection means, and a second steering angle of the steerable wheels computed through use of a difference between the speeds of the rear-side left and right wheels among those detected by the wheel speed detection means.

Since the steering angle estimation means estimates the steering angle of the steerable wheels by averaging the first and second steering angles, even in the case where the steering angle of the steerable wheels is estimated on the basis of the above-mentioned Ackermann Jeantaud theory, the influence of deterioration of the estimation accuracy stemming from a decrease in the Ackermann ratio on the front wheel side (steerable wheel side) and the influence of deterioration of the estimation accuracy stemming from occurrence of dragging on the rear wheel side can be cancelled out. Accordingly, the steering angle estimation means can accurately estimate the steering angle of the steerable wheels.

In these cases, preferably, when the vehicle speed detected by the vehicle speed detection means is equal to or lower than a previously set speed, the steering angle estimation means sets the computed first and second steering angles of the steerable wheels to "0".

By virtue of this configuration, in a low vehicle speed range in which the wheel speed detection means cannot detect the speed of each wheel accurately, the computed first and second steering angles become "0". Thus, it is possible to prevent estimation of an erroneous steering angle of the steerable wheels, and prevent application of an improper assist force for assisting the rotation operation of the steering wheel by the driver.

Another feature of the present invention resides in that the control means includes operation speed detection means for detecting a rotational operation speed of the steering wheel; and the axial force estimation means includes correction axial force computation means for computing a correction axial force through use of the rotational operation speed detected by the operation speed detection means and the vehicle speed detected by the vehicle speed detection means, the correction axial force having a predetermined relation with the rotational operation speed of the steering wheel and the vehicle speed and being used for correcting the estimated axial force.

By virtue of this configuration, the correction assist torque computation means can compute a correction axial force used for correcting the axial force, which is estimated by the axial force estimation means, on the basis of the speed at which the steering wheel is rotated by the driver, and the vehicle speed. That is, since the correction axial force is computed and the axial force estimated by the axial force estimation means is corrected through use the computed correction axial force, an axial force difference can be imparted to the estimated axial force; in other words, hysteresis can be imparted to the estimated axial force, in consideration of the state of the rotation operation of the steering wheel by the driver. Accordingly, since a proper axial force can be estimated in accordance with the state of the rotation operation of the steering wheel by the driver, it is possible to effectively prevent the driver from having an unnatural sensation when he or she rotates the steering wheel.

Preferably, the correction axial force—which is computed on the basis of the speed of the rotation operation of the steering wheel by the driver (the state of rotation operation)—is computed in consideration of an axial force which is input to the steering mechanism due to a friction force generated between the steerable wheels and a road surface when the steerable wheels are steered. In this case, the magnitude and acting direction of the friction force generated between the steerable wheels and the road surface changes in accordance with the speed of the rotation operation of the steering wheel by the drive (the state of rotation operation) and the vehicle speed.

Preferably, of the relations among the rotational operation speed of the steering wheel, the vehicle speed, and the correction axial force, at least the relation between the rotational operation speed of the steering wheel and the correction axial force is determined for computation of the correction axial force such that, when the rotational operation speed of the steering wheel is less than a previously set first rotational operation speed, the correction axial force increases as the rotational operation speed of the steering wheel increases, and, when the rotational operation speed of the steering wheel is equal to or greater than a previously set second rotational operation speed greater than the first rotational operation speed, the correction axial force decreases as the rotational operation speed of the steering wheel increases; and the correction axial force computation means computes the correction axial force on the basis of the previously determined relation through use of the rotational operation speed detected by the operation speed detection means.

By virtue of this configuration, in a situation where the speed of the rotation operation of the steering wheel by the driver increases to a speed less than the first rotational operation speed, the correction assist torque computation means increases the correction axial force. As a result, the driver can sense a proper assist force for assisting the rotation operation of the steering wheel; in other words, a reaction force of a proper magnitude stemming from the axial force (friction force) input to the steering mechanism as a result of steering of the steerable wheels. Meanwhile, in a situation where the speed of the rotation operation of the steering wheel by the driver becomes equal to or greater than the second rotational operation speed, the correction assist torque computation means decreases the correction axial force. By virtue of this operation, even when the driver rotates the steering wheel quickly, the driver does not sense insufficiency of the assist force; in other words, an excessively large reaction force stemming from the axial force (friction force) input to the steering mechanism as a result of steering of the steerable wheels.

In these cases, of the relations among the rotational operation speed of the steering wheel, the vehicle speed, and the correction axial force, at least the relation between the vehicle speed and the correction axial force is determined for computation of the correction axial force such that the correction axial force decreases toward a predetermined level as the vehicle speed increases; and the correction axial force computation means computes the correction axial force on the basis of the previously determined relation through use of the vehicle speed detected by the vehicle speed detection means.

By virtue of this configuration, the correction assist torque computation means can decrease the correction axial force as the vehicle speed increases. Accordingly, through use of the correction axial force which is computed to become larger in a low vehicle speed range, the axial force estimated by the axial force estimation means can be corrected such that the estimated axial force becomes larger. Therefore, by means of applying a large assist force for assisting the rotation operation of the steering wheel, the driver can sense a proper assist force (small axial force). Meanwhile, when the vehicle speed increases, since the correction axial force is computed to become smaller, the amount by which the estimated axial force is increased by the correction axial force decreases. Therefore, by means of applying a small assist force for assisting the rotation operation of the steering wheel, the driver can sense a firm reaction (large axial force). Notably, decreasing of the correction axial force with an increase in the vehicle speed corresponds to, for example, decreasing of the friction force generated between the steerable wheels and the road surface with an increase in the vehicle speed.

Another feature of the present invention resides in that the assist force computation means compares the absolute value of the determined target steering force and the absolute value of the axial force estimated by the axial force estimation means, sets the assist force to "0" when the absolute value of the estimated axial force is equal to or less than the absolute value of the target steering force, and computes the assist force by subtracting the target steering force from the estimated axial force when the absolute value of the estimated axial force is greater than the absolute value of the target steering force.

By virtue of this configuration, the assist computation means can compare the absolute value of the target steering force which the driver must input via the steering wheel and the absolute value of the estimated axial force. Thus, the assist computation means can set the assist force to "0" when the absolute value of the estimated axial force is equal to or less than the absolute value of the target steering force. Also, the assist computation means can compute the assist force, on which the assist direction is reflected, by subtracting the target steering force from the estimated axial force when the absolute value of the estimated axial force is greater than the absolute value of the target steering force.

As a result, when the absolute value of the estimated axial force is equal to or less than the absolute value of the target steering force, no assist force is applied even when the driver rotates the steering wheel. In other words, the absolute value of the target steering force determines the size of a dead band provided associated with application of the assist force. Meanwhile, when the absolute value of the estimated axial force is greater than the absolute value of the target steering force, an assist force corresponding to an amount by which the absolute value of the estimated axial force exceeds the absolute value of the target steering force (dead band) is applied. Therefore, the minimum assist can be applied to the rotation operation of the steering wheel by the driver.

In this case, the assist force computation means can determine the target steering force such that, when the vehicle speed detected by the vehicle speed detection means is less than a previously set, predetermined vehicle speed, the absolute value of the target steering force increases as the detected vehicle speed increases, and, when the detected vehicle speed is equal to or greater than the previously set, predetermined vehicle speed, the absolute value of the target steering force is maintained constant irrespective of the detected vehicle speed.

By virtue of this configuration, the absolute value of the target steering force, which coincides with the size of the above-mentioned dead band, is determined to become smaller in the low vehicle speed range. Therefore, even when the estimated axial force is small, the assist force can be applied. Accordingly, in the low vehicle speed range, the driver can rotate the steering wheel very easily with a small operation force, whereby satisfactory performance of maneuvering the vehicle can be secured.

Meanwhile, in an intermediate/high vehicle speed range which is equal to or higher than a predetermined vehicle speed, the absolute value of the target steering force is determined to become a certain large value. Therefore, the size of the above-mentioned dead band increases, and, when the estimated axial force is small, no assist force is applied. Accordingly, in the intermediate/high vehicle speed range, the driver can rotate the steering wheel with a slightly large operation force; in other words, can rotate the steering wheel while sensing a firm reaction. Therefore, satisfactory travel stability can be secured.

Still another feature of the present invention resides in that the steering angle estimation means computes a steering angle difference which represents the difference between the first and second steering angles which increases and decreases in accordance with the state of slippage which has occurred at any of the front-side left and right wheels and the rear-side left and right wheels; and the assist force computation means includes assist force correction means for correcting the computed assist force on the basis of the magnitude of the steering angle difference computed by the steering angle estimation means and in accordance with the state of the slippage which has occurred at any of the front-side left and right wheels and the rear-side left and right wheels.

By virtue of this configuration, the assist force correction means can determine the state of the slippage having occurred at any one of the front-side left and right wheels and the rear-side left and right wheels, as the rotating state of the wheels, on the basis of the steering angle difference between the first and second steering angles computed by the steering angle estimation means. That is, when slippage occurs at any one of the front-side left and right wheels and the rear-side left and right wheels, the turning centers of the front-side left and right wheels and the rear-side left and right wheels do not coincide with each other, and, as a result, the steering angle difference increases. Therefore, when the steering angle difference increases, it can be determined that slippage of a large slip ratio has occurred at any one of the front-side left and right wheels and the rear-side left and right wheels.

Accordingly, the assist force correction means can correct the magnitude of the assist force on the basis of the computed steering angle difference; in other words, the state of slippage having occurred at any one of the front-side left and right wheels and the rear-side left and right wheels. Also, since the assist force correction means can determine, on the basis of the computed steering angle difference, whether or not slippage has occurred, other sensors (e.g., an acceleration sensor, a yaw rate sensor, etc.) are not required to be provided separately. Therefore, cost can be reduced.

In this case, the assist force correction means may include slip gain determination means for determining, through use of the steering angle difference computed by the steering angle estimation means, a slip gain for correcting the magnitude of the assist force computed by the assist force computation means in accordance with the state of slippage having occurred at any one of the front-side left and right wheels and the rear-side left and right wheels, the slip gain determination means determining the slip gain such that the slip gain decreases when the computed steering angle difference is equal to or greater than a previously set first steering angle difference, and the slip gain becomes zero when the computed steering angle difference is equal to or greater than a previously set second steering angle difference greater than the first steering angle difference; and corrected assist force computation means for computing a corrected assist force by multiplying the computed assist force by the slip gain determined by the slip gain determination means.

By virtue of this configuration, the slip gain determination means can determine the slip gain in accordance with the computed steering angle difference; that is, the state of slippage having occurred at any one of the front-side left and right wheels and the rear-side left and right wheels, and the corrected assist force computation means can compute a corrected assist force by multiplying together the assist force computed by the assist force computation means and the slip gain. Therefore, the assist force correction means can decrease the assist force computed by the assist force computation means, through use of the slip gain which decreases as the computed steering angle difference (that is, the degree of slippage) increases. As a result, application of excessive assist force and self-steer which would otherwise occur at the slipping wheel can be reliably prevented. Also, the slip gain determination means can decrease the slip gain gradually as the steering angle difference (the degree of slippage) increases. By virtue of this, for example, in the case where slippage has occurred at any one of the front-side left and right wheels and the rear-side left and right wheels, the assist force correction means can correct the assist force such that the assist force decreases gradually. Therefore, sudden change of the assist force can be prevented reliably.

In this case, the assist force correction means may include slip gain recovery determination means. If the assist force computed by the assist force computation means is not "0" when the steering angle difference computed by the steering angle estimation means becomes less than the second steering angle difference, the slip gain recovery determination means prohibits the slip gain, which is determined by the slip gain determination means through use of the computed steering angle difference, from becoming greater than "0" to thereby maintain the slip gain at "0". If the assist force computed by the assist force computation means is "0" when the steering angle difference computed by the steering angle estimation means becomes less than the second steering angle difference, the slip gain recovery determination means permits the slip gain, which is determined by the slip gain determination means through use of the computed steering angle difference, from recovering and becoming greater than "0".

By virtue of this configuration, in a situation where the slip gain changes from "0" to a value greater than "0", the slip gain recovery determination means can determine whether to change the value of the slip gain, on the basis of the magnitude of the assist force computed by the assist force computation means. If the steering angle difference accidentally becomes less than the second steering angle difference in a state in which the steering angle difference has been equal to or greater than the second steering angle difference (a complete slip state in which the slip ratio becomes "1"), the slip gain determination means may determine the slip gain to become greater than "0". In such a case, if the slip gain recovery determination means is not provided, the following problem occurs. If an assist force greater than "0" has been computed, the corrected assist force is applied, which may result in application of excessive assist force and occurrence of self-steer at the slipping wheel.

Therefore, only when the computed assist force is "0" in the above-described situation, the slip gain recovery determination means permits the slip gain, which is maintained at "0", from recovering to a value which is greater than "0" and determined by the slip gain determination means in accordance with the steering angle difference. Since the slip gain can be maintained at "0" until application of the assist force becomes unnecessary, application of excessive assist force and occurrence of self-steer at the slipping wheel can be prevented reliably.

BEST MODE FOR CARRYING OUT THE INVENTION

Figure 1:
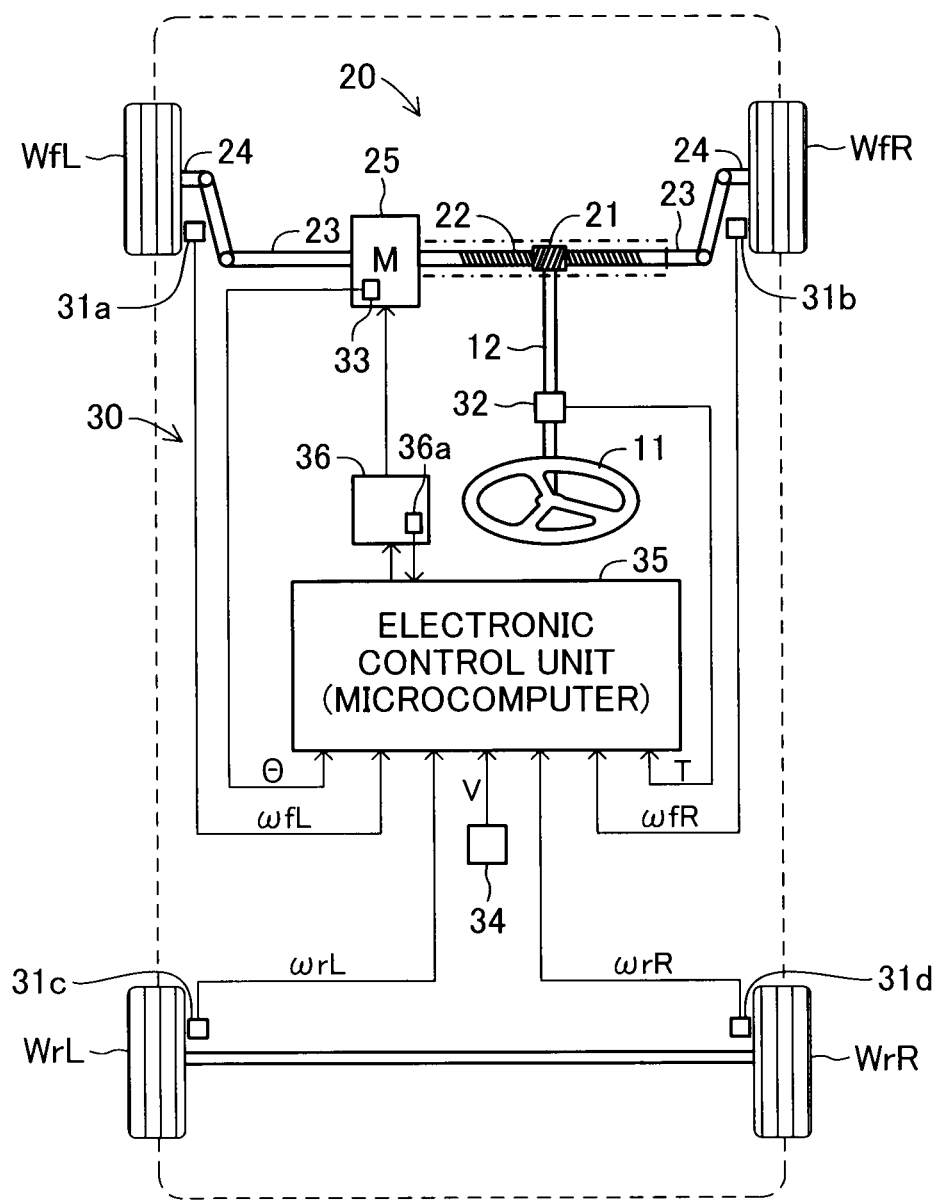
FIG. 1 is a schematic diagram showing an electric power steering apparatus for a vehicle according to an embodiment of the present invention.

An electric power steering apparatus according to an embodiment of the present invention will now be described with reference to the drawings. FIG. 1 schematically shows the electric power steering apparatus installed in a vehicle as the present embodiment.

This electric power steering apparatus has a steering wheel 11 which is turned by a driver to steer left and right front wheels WfL and WfR; namely, steerable wheels. The steering wheel 11 is secured to the upper end of a steering shaft 12, and the lower end of the steering shaft 12 is connected to a steering gear unit 20, which serves as a steering mechanism.

The steering gear unit 20 is, for example, a rack-and-pinion-type gear unit, and is designed such that rotation of a pinion gear 21 integrally mounted to the lower end of the steering shaft 12 is transmitted to a rack bar 22. The left and right ends of the rack bar 22 are connected to the left and right front wheels WfL and WfR respectively via tie rods 23 and knuckles 24. In addition, the steering gear unit 20 includes an electric motor 25 for generating an assist force (hereinafter referred to as an assist torque Ta) which reduces a steering torque T; namely, an operation force applied by the driver to steer the left and right front wheels WfL and WfR by turning the steering wheel 11. This electric motor 25 is mounted such that the generated assist torque Ta can be transmitted to the rack bar 22. Notably, the electric motor 25 may be of any type, such as a brushless motor or a brushed motor, as long as it can generate the assist torque Ta. However, in the following description, the electric motor 25 is assumed to be a brushless motor.

By virtue of this configuration, the steering torque T applied from the steering wheel 11 to the steering shaft 12 is transmitted to the rack bar 22 via the pinion gear 21, and the assist torque Ta generated by the electric motor 25 is transmitted to the rack bar 22. The rack bar 22 moves axially due to the steering torque T and the assist torque Ta transmitted in such a manner. This axial movement of the rack bar 22 steers the left and right front wheels WfL and WfR connected thereto via the tie rods 23 and knuckles 24.

Next, there will be described an electric control apparatus 30 used as control means for controlling operation of the electric motor 25. The electric control apparatus 30 includes wheel speed sensors 31a to 31d used as wheel speed detection means, a steering torque sensor 32 used as operation force detection means, a motor rotational angle sensor 33 used as operation speed detection means, and a vehicle speed sensor 34 used as vehicle speed detection means. As shown in FIG. 1, the wheel speed sensors 31a to 31d are mounted in the vicinity of the left and right front wheels WfL and WfR and left and right rear wheels WrL and WrR of the vehicle respectively. These sensors detect rotation speeds of the wheels WfL, WfR, WrL, and WrR, and output signals representing wheel speeds $\omega$fL, $\omega$fR, $\omega$rL, and $\omega$rR. Notably, each of the wheel speeds $\omega$fL, $\omega$fR, $\omega$rL, and $\omega$rR assumes a positive value when the vehicle moves forward, and a negative value when the vehicle moves backward.

The steering torque sensor 32 is mounted to the steering shaft 12 so as to detect the torque applied to the steering shaft 12, and outputs a signal representing the steering torque T. Notably, the steering torque T assumes a positive value when the steering shaft 12 is turned clockwise, and a negative value when the steering shaft 12 is turned counterclockwise. The motor rotational angle sensor 33 is mounted to the electric motor 25 so as to detect a rotation angle (electric angle) of the electric motor 25, and outputs a signal representing a motor rotational angle $\Theta$. Notably, the motor rotational angle $\Theta$ assumes a positive value when the rack bar 22 is moved to the right, and a negative value when the rack bar 22 is moved to the left. The vehicle speed sensor 34 detects the vehicle speed, and outputs a signal representing a vehicle speed V.

The wheel speed sensors 31a to 31d, the steering torque sensor 32, the motor rotational angle sensor 33, and the vehicle speed sensor 34 are connected to an electronic control unit 35. The electronic control unit 35 is mainly composed of a microcomputer which includes a CPU, a ROM, and a RAM. The electronic control unit 35 controls operation of the electric motor 25 by executing various programs, to thereby generate the assist torque Ta. Accordingly, a drive circuit 36 for driving the electric motor 25 is connected to the output side of the electronic control unit 35. The drive circuit 36 includes a current detector 36a for detecting drive current flowing through the electric motor 25. The drive current detected by the current detector 36a is fed back to the electronic control unit 35 so as to control the drive of the electric motor 25.

In the electric power steering apparatus configured as described above, the electronic control unit 35 determines the assist torque Ta on the basis of mainly the steering torque T detected by the steering torque sensor 32. Hereinafter, there will be described normal control which is performed when the steering torque sensor 32 is detecting the steering torque T normally. Notably, since the normal control is similar to that conventionally known and is not related directly to the present invention, it will be described below only briefly.

The electronic control unit 35 receives a signal which represents the steering torque T detected by the steering torque sensor 32 and a signal which represents a vehicle speed V detected by the vehicle speed sensor 34. The electronic control unit 35 removes disturbance components (low-frequency components) from the signal representing the steering torque T by performing high-pass filter processing, and compensates for a phase difference (phase delay) produced between the rotation of the steering handle 11 turned by the driver and the detected steering torque T. Next, the electronic control unit 35 determines the assist torque Ta applied under the normal control on the basis of the corrected steering torque T and the vehicle speed V.

Furthermore, the electronic control unit 35 performs damping control to dampen the vibration which is generated in the turning direction of the steering wheel 11 due to inertia accompanying the rotation of the electric motor 25. In addition, the electronic control unit 35 performs return control to return the steering wheel 11 to the neutral position. Specifically, the electronic control unit 35 performs the damping control in such a manner that it obtains a motor rotational angular speed $\Theta'$ by differentiating, with respect to time, the motor rotational angle $\Theta$ detected by the motor rotational angle sensor 33, and applies a torque for dampening vibration of the steering wheel 11 in the turning direction, on the basis of a change in the motor rotational angular speed $\Theta'$. In addition, the electronic control unit 35 performs the return control in such a manner that it determines, on the basis of a change in the motor rotational angle $\Theta$, whether or not the steering direction of the left and right front wheels WfL and WfR has changed toward the neutral position, and applies a torque for returning the steering wheel 11 to the neutral position when the steering direction has changed toward the neutral position.

As described above, upon determination of the assist torque Ta for the normal control, the torque for the damping control, and the torque for the return control, the electronic control unit 35 adds these torques together to obtain a total torque, and controls the drive circuit 36 to supply a drive current corresponding to the total torque to the electric motor 25. Thus, under the normal control, the driver can turn the steering wheel 11 very easily and comfortably without feeling uncomfortable vibration of the steering wheel 11 and an unnatural sensation during return operation of the steering wheel 11.

As mentioned above, under the normal control, the electronic control unit 35 determines the assist torque Ta using the steering torque T detected by the steering torque sensor 32, in other words, by feeding back the detected steering torque T. Therefore, if an anomaly occurs in the steering torque sensor 32, the electronic control unit 35 cannot apply an appropriate assist torque Ta by driving and controlling the electric motor 25 in accordance with the turning operation of the steering wheel 11 performed by the driver. To solve this problem, in case where an anomaly occurs in the steering torque sensor 32, the electronic control unit 35 switches its control mode from the normal control (feedback control) to backup control (feedforward control). Thus, the electronic control unit 35 can continuously apply an appropriate assist torque Ta by driving the electric motor 25 under the backup control. Hereinafter, the backup control will be described in detail.

Before switching to the backup control, the electronic control unit 35 determines whether or not any anomaly has occurred in the steering torque sensor 32 under the normal control. Specifically, the electronic control unit 35 determines whether or not it can receive a signal representing the steering torque T from the steering torque sensor 32. That is, in the case where a signal line used for communications between the electronic control unit 35 and the steering torque sensor 32 is broken and the electronic control unit 35 can receive no signal from the steering torque sensor 32, the electronic control unit 35 determines that an anomaly has occurred in the steering torque sensor 32.

In addition, the electronic control unit 35 determines whether or not a state in which the value of the steering torque T represented by the signal received from the steering torque sensor 32 coincides with the predetermined upper or lower detection limit value of the steering torque sensor 32 has continued for a predetermined period of time. That is, if the state in which the value of the steering torque T coincides with the upper or lower detection limit value has continued for a predetermined period of time, the electronic control unit 35 determines that an anomaly has occurred in the steering torque sensor 32.

In addition, the electronic control unit 35 determines whether or not the value of the steering torque T represented by the signal received from the steering torque sensor 32 is "0" when the value of the motor rotation angle Θ represented by the signal received from the motor rotational angle sensor 33 is not "0". In other words, the electronic control unit 35 determines that an anomaly has occurred in the steering torque sensor 32 if the value of the detected steering torque T is "0" when the value of the motor rotational angle Θ is not "0"; that is, the assist torque Ta is applied to the steering shaft 12 at least through the drive of the electric motor 25.

Upon determining that an anomaly has occurred in the steering torque sensor 32 through performance of the above-described anomaly detection process, the electronic control unit 35 switches its control mode from the normal control to the backup control.

Figure 2:
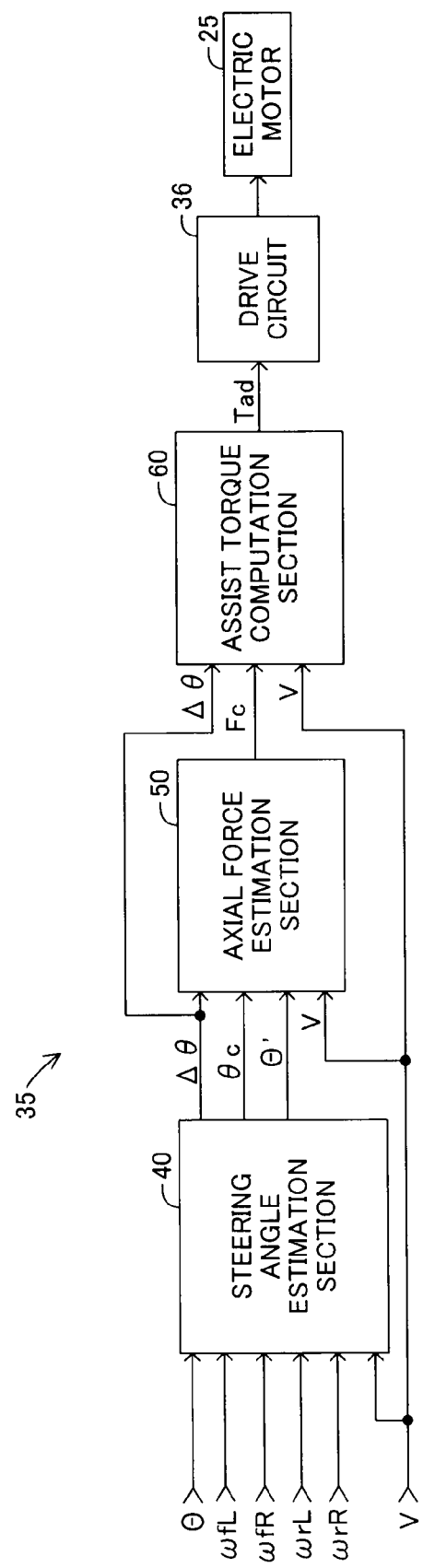
FIG. 2 is a block diagram representing control processing executed by an electronic control unit of FIG. 1.

As shown in FIG. 2, the electronic control unit 35 includes a steering angle estimation section 40, which serves as steering angle estimation means, a axial force estimation section 50, which serves as steering angle estimation means, and an assist torque computation section 60, which serves as assist force computation means, in order to perform the backup control. Hereinafter, these sections 40, 50, and 60 will be described in detail.

Figure 3:
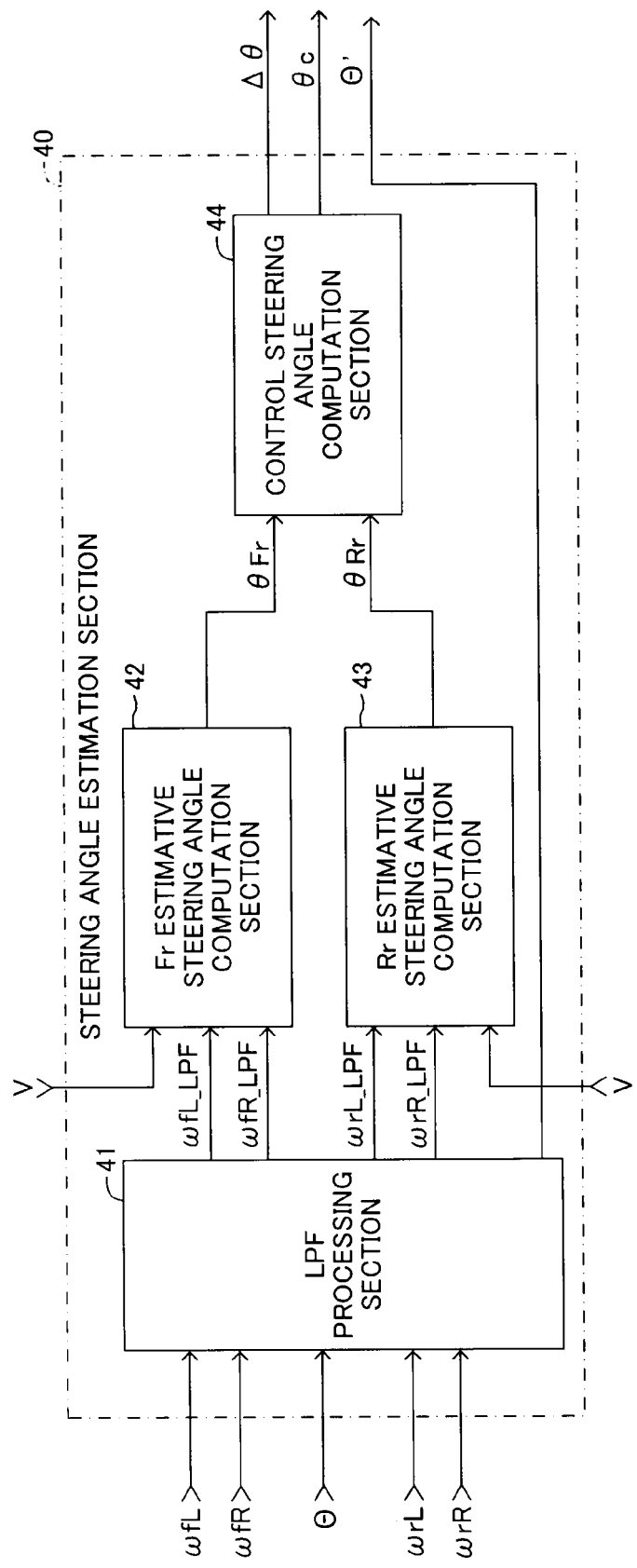
FIG. 3 is a block diagram representing control processing executed by a steering angle estimation section of FIG. 2.

As shown in FIG. 3, the steering angle estimation section 40 includes a low-pass filter processing section 41 (hereinafter simply referred to as an LPF processing section 41), which serves as filter processing means for performing low-pass filter processing for the signals representing wheel speeds ωfL, ωfR, ωrL, and ωrR received from the wheel seed sensors 31a to 31d. The LPF processing section 41 performs filter processing so as to remove high-frequency noise components from the signals representing the wheel speeds ωfL, ωfR, ωrL, and ωrR received from the wheel seed sensors 31a to 31d (specifically, high-frequency noise components added by road surface disturbance) through use of a low-pass filter expressed by a transfer function H(s) shown in the following equation Eq. (3):

$$H(s) = \frac{1}{1 + T(|\Theta'|)s} \quad \text{Eq. (3)}$$

In the above Eq. (3), s is a Laplace operator, and T(|Θ'|) is a cutoff frequency defined as a function of the speed at which the steering wheel 11 is turned by the driver (hereinafter referred to as a steering speed).

Here, the cutoff frequency T(|Θ'|) will be described. Generally, the low-pass filter has a characteristic that the computation load increases, the gain of the output signal decreases, and the phase delay increases as the frequency of the input signal increases. In the case where filter processing is performed for the signals representing the wheel speeds ωfL, ωfR, ωrL, and ωrR using the low-pass filter having such a characteristic, a long phase delay is likely to occur, especially when the driver turns the steering wheel 11 quickly. If such a large phase delay occurs, the error of an estimative steering angle θc computed as described later can become large.

That is, the input frequencies of the signals representing the wheel speeds ωfL, ωfR, ωrL, and ωrR increase with the steering speed and the resultant phase delay increases the error of the estimative steering angle θc. As a result, if the driver turns the steering wheel 11 at a high steering speed, application of the assist torque Ta (more particularly, corrected assist torque Tad) by the backup control delays, as will be described later.

Thus, in the beginning of the driver's operation of turning the steering wheel 11, the assist torque Ta (corrected assist torque Tad) applied by the electric motor 25 is insufficient and the steering torque T increases accordingly. After this, the steering torque T decreases suddenly due to the delayed application of the assist torque Ta (corrected assist torque Tad). Accordingly, if the driver turns the steering wheel 11 at a high steering speed while the backup control is being performed, he or she feels an unnatural sensation due to the sudden change in the steering torque T, and may not be able to operate the steering wheel 11 properly.

To solve this problem, the LPF processing section 41 performs low-pass filter processing using the cutoff frequency T(|Θ'|) which changes with the steering speed. Specifically, the LPF processing section 41 first obtains the motor rotational angular speed Θ' by differentiating, with respect to time, the motor rotational angle Θ represented by the signal received from the motor rotational angle sensor 33. Notably, the steering wheel 11 (more specifically, the steering shaft 12) is mechanically connected to the electric motor 25 via the pinion gear 21 and the rack bar 22; i.e., the steering wheel 11 rotates in synchronism with the electric motor 25. Hence, the motor rotational angular speed Θ' corresponds to the speed (i.e., steering speed) at which the steering wheel 11 (steering shaft 12) is turned by the driver. Accordingly, in the present embodiment, the cutoff frequency T(|Θ'|) is determined on the basis of the motor rotational angular speed Θ' that corresponds to the steering speed.

Figure 4:
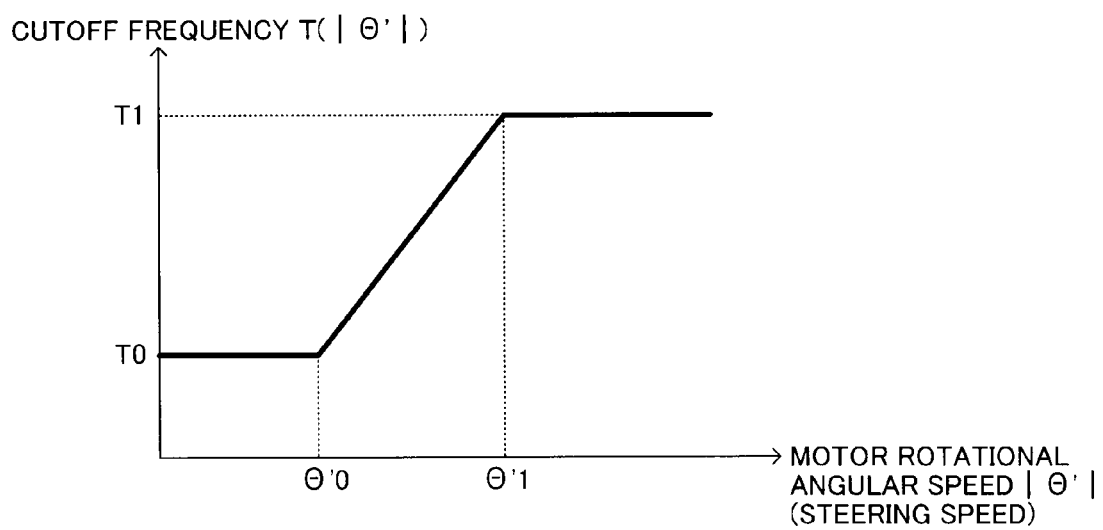
FIG. 4 is a graph showing the relation between steering speed (motor rotational angular speed) and cutoff frequency.

Here, the method of determining the cutoff frequency T(|Θ'|) will be specifically described. The LPF processing section 41 refers to the cutoff frequency determination map shown in FIG. 4 so as to determine the cutoff frequency T(|Θ'|) corresponding to the absolute value of the motor rotational angular speed Θ' computed as mentioned above. As shown in FIG. 4, the cutoff frequency T(|Θ'|) is set to a predetermined lower cutoff frequency T0 when the absolute value of the motor rotational angular speed Θ' is less than a predetermined rotational angular speed Θ'0. Thus, when the absolute value of the motor rotational angular speed Θ' is less than the predetermined rotational angular speed Θ'0, the absolute value of the motor rotational angular speed Θ' is in a dead band region where the cutoff frequency T(|Θ'|) is constant (lower cutoff frequency T0) regardless of the speed at which the steering wheel 11 is turned by the driver.

In addition, when the absolute value of the motor rotational angular speed Θ' is equal to or greater than the rotational angular speed Θ'0 and less than a predetermined rotational angular speed Θ'1, the cutoff frequency T(|Θ'|) is set to a value which changes within the range from the lower cutoff frequency T0 to a predetermined upper cutoff frequency T1.

Furthermore, when the absolute value of the motor rotational angular speed $\Theta'$ is equal to or greater than the rotational angular speed $\Theta'1$, the cutoff frequency $T(|\Theta'|)$ is set to the upper cutoff frequency T1.

Incidentally, the low-pass filter processing can be appropriately performed for the signals representing the wheel speeds ωfL, ωfR, ωrL, and ωrR by providing the dead band region when the absolute value of the motor rotational angular speed $\Theta'$ is less than the predetermined rotational angular speed $\Theta'0$. Specifically, in general, the signal representing the motor rotational angle $\Theta$ which is output from the motor rotational angle sensor 33 contains noise and the detected motor rotational angle $\Theta$ fluctuates. Therefore, the following problem occurs when the steering wheel 11 is turned at a low steering speed (motor rotational angular speed $\Theta'$). If the dead band region is not provided, the cutoff frequency $T(|\Theta'|)$ is likely to change due to the noise contained in the signal representing the motor rotational angular speed $\Theta'$ or the change in the motor rotational angular speed $\Theta'$, and, in some cases, high-frequency noise components contained in the signals representing the wheel speeds ωfL, ωfR, ωrL, and ωrR cannot be satisfactorily removed. Consequently, the assist characteristic, which represents the relation between the speed at which the steering wheel 11 is turned by the driver (motor rotational angular speed $\Theta'$) and the applied assist torque Ta (corrected assist torque Tad), becomes too sensitive in some cases.

To solve this problem, a dead band region is provided such that, when the absolute value of the motor rotational angular speed $\Theta'$ is less than the predetermined rotational angular speed $\Theta'0$, the cutoff frequency $T(|\Theta'|)$ is set to the lower cutoff frequency T0, whereby the high-frequency noise components contained in the signals representing the wheel speeds ωfL, ωfR, ωrL, and ωrR are appropriately removed. Thus, the assist characteristic can be prevented from becoming too sensitive when the driver holds the steering wheel 11 at a certain angular position or turns it at a very low steering speed.

On the other hand, low-pass filter processing can be appropriately performed for the signals representing the wheel speeds ωfL, ωfR, ωrL, and ωrR by setting the cutoff frequency $T(|\Theta'|)$ to the upper cutoff frequency T1 when the absolute value of the motor rotational angular speed $\Theta'$ is equal to or greater than the rotational angular speed $\Theta'1$. Specifically, when the vehicle travels along a rutty road, noise of large amplitude may be superimposed on the signals representing wheel speeds ωfL, ωfR, ωrL, and ωrR, and the steering speed (motor rotational angular speed $\Theta'$) may increase significantly because the steering wheel 11 is forcedly turned by an external force from the road surface. In such a case, if the upper cutoff frequency T1 is not provided, the cutoff frequency $T(|\Theta'|)$ may become extremely high as a result of the significant increase in the steering speed (motor rotational angular speed $\Theta'$), and the high-frequency noise contained in the signals representing wheel speeds ωfL, ωfR, ωrL, and ωrR cannot be appropriately removed in some cases. As a result, the applied assist torque Ta (corrected assist torque Tad) changes greatly and the control system can become unstable.

In view of this, when the absolute value of the motor rotational angular speed $\Theta'$ is equal to or greater than the rotational angular speed $\Theta'1$, the cutoff frequency $T(|\Theta'|)$ is set to the upper cutoff frequency T1. Thus, the high-frequency components contained in the signals representing the wheel speeds ωfL, ωfR, ωrL, and ωrR can be appropriately removed even when the steering wheel 11 is turned at a high steering speed (motor rotational angular speed $\Theta'$). Thus, a change in the applied assist torque Ta (corrected assist torque Tad) can be decreased.

Notably, instead of referring to the above-described cutoff frequency determination map, there may be used a function which defines the relation between the absolute value of the motor rotational angular speed $\Theta'$ and the cutoff frequency $T(|\Theta'|)$. The function is defined such that the cutoff frequency $T(|\Theta'|)$ is set to the cutoff frequency T0 when the motor rotational angular speed $\Theta'$ is less than the predetermined rotational angular speed $\Theta'0$, the cutoff frequency $T(|\Theta'|)$ changes within the range from the lower cutoff frequency T0 to the predetermined upper cutoff frequency T1 when the absolute value of the motor rotational angular speed $\Theta'$ is equal to or greater than the rotational angular speed $\Theta'0$ and less than the predetermined rotational angular speed $\Theta'1$, and the cutoff frequency $T(|\Theta'|)$ is set to the cutoff frequency T1 when the absolute value of the motor rotational angular speed $\Theta'$ is equal to or greater than the predetermined rotational angular speed $\Theta'1$. The cutoff frequency $T(|\Theta'|)$ is determined through use of the function defined as described above.

As mentioned above, by changing the cutoff frequency $T(|\Theta'|)$ in accordance with the steering speed (i.e., the absolute value of the motor rotational angular speed $\Theta'$), the cutoff frequency $T(|\Theta'|)$ can be set to increase with the speed at which the steering wheel 11 is turned by the driver (motor rotational angular speed $\Theta'$). This reduces the phase delay accompanying the low-pass filter processing even when the input frequencies of the signals representing wheel speeds ωfL, ωfR, ωrL, and ωrR increase. Since the phase delay can be reduced, the assist torque Ta can be applied with reduced delay from the driver's operation of turning the steering wheel 11. Accordingly, the driver does not feel an unnatural sensation due to the change in the steering torque T, and can operate the steering wheel 11 properly.

After determining the cutoff frequency $T(|\Theta'|)$ as mentioned above, the LPF processing section 41 performs low-pass filter processing for the signals representing the wheel speeds ωfL, ωfR, ωrL, and ωrR received from the wheel speed sensors 31a to 31d. Next, the LPF processing section 41 sends to an Fr estimative steering angle computation section 42 signals representing wheel speeds ωfL_LPF and ωfR_LPF from which high-frequency noise components have been removed. In addition, the LPF processing section 41 also sends to an Rr estimative steering angle computation section 43 signals representing wheel speeds ωrL_LPF and ωrR_LPF from which high-frequency noise components have been removed.

The Fr estimative steering angle computation section 42 computes a front-wheel-side estimative steering angle θFr (i.e., a first steering angle) using the wheel speeds ωfL_LPF and ωfR_LPF represented by the signals received from the LPF processing section 41. That is, the Fr estimative steering angle computation section 42 computes the front-wheel-side estimative steering angle θFr in accordance with the following Eq. (4):

$$\theta Fr = GR \times \frac{1}{2}\arcsin\left\{\frac{4L}{W} \times \left(\frac{\omega fL\_LPF - \omega fR\_LPF}{\omega fL\_LPF + \omega fR\_LPF}\right)\right\} \qquad \text{Eq. (4)}$$

Note that the second term on the right side of the above Eq. (4) is substantially the same as that of the previously mentioned Eq. (1) which is based on the Ackermann Jeantaud theory. In the above Eq. (4), GR is a constant which represents the overall gear ratio (the ratio of the detected steering angle to the actual steering angle of each steerable wheel) of the vehicle which is empirically determined in advance on the basis of the suspension geometric characteristic of the vehicle.

The accuracy of estimative computation of the front-wheel-side estimative steering angle θFr can be improved by taking into account the overall gear ratio GR of the vehicle. This will be described hereinafter.

Figure 18:
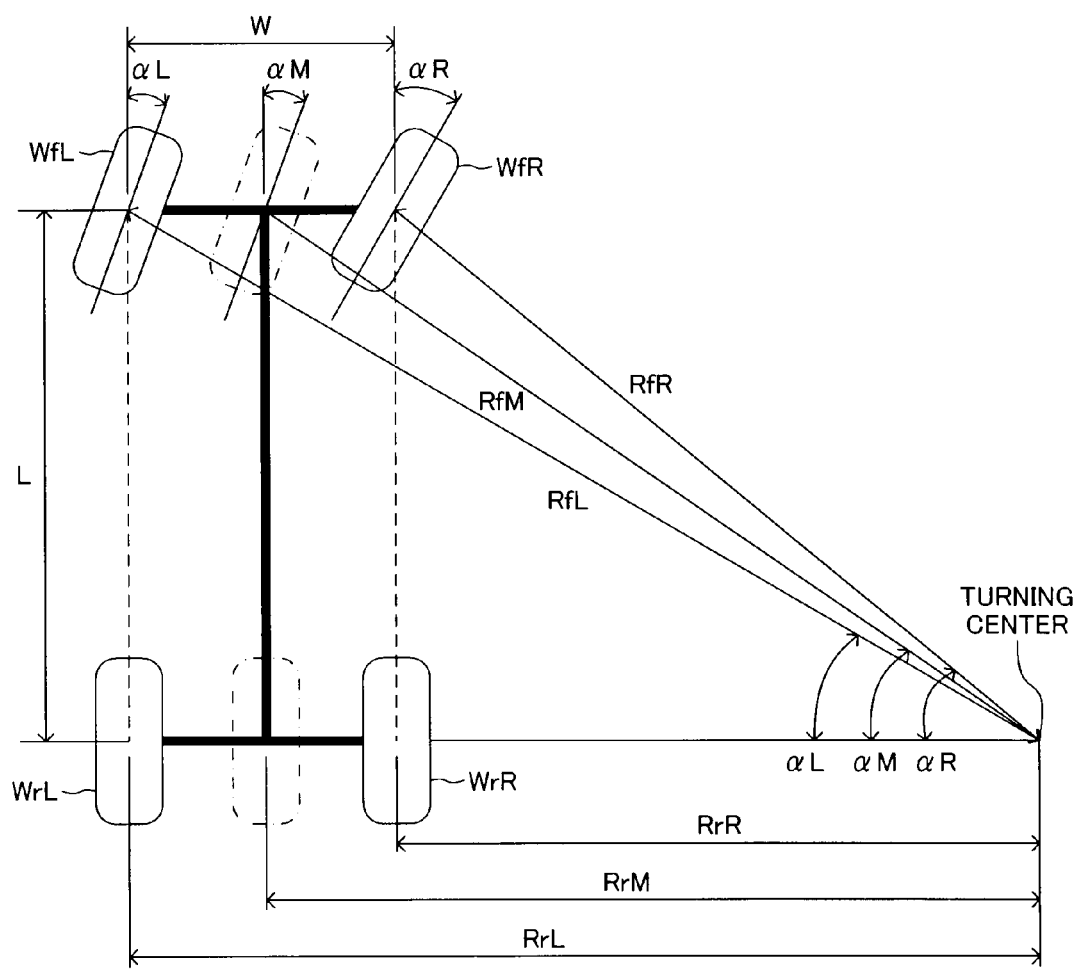
FIG. 18 is a view for describing estimation of the steering angle of steerable wheels on the basis of the known Ackermann Jeantaud theory.

As described above, according to the Ackermann Jeantaud theory, the vehicle can turn smoothly and a good steering characteristic can be attained if the four wheels WfL, WfR, WrL, and WrR of the vehicle move forward in such a manner that they draw concentric circles with different radii around the common turning center as shown in FIG. 18. In order that the Ackermann Jeantaud theory stands, the left and right front wheels WfL and WfR, which are the steerable wheels, must satisfy the condition that the Ackermann angle αR of the inner steerable wheel (right wheel WfR in FIG. 18) is larger than the Ackermann angle αL of the outer steerable wheel (left wheel WfL in FIG. 18). Furthermore, the left and right front wheels WfL and WfR must satisfy the condition that the Ackermann ratio between the Ackermann angle αR of the inner steerable wheel (right wheel WfR in FIG. 18) and the Ackermann angle αL of the outer steerable wheel (left wheel WfL in FIG. 18) is maintained constant.

Figure 5A:
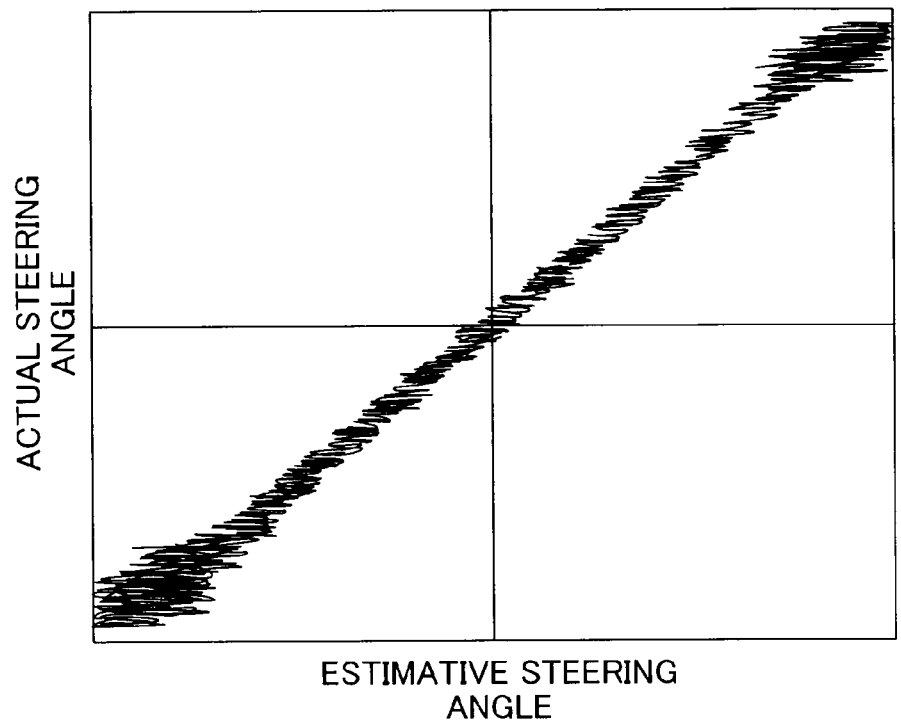
FIGS. 5A and 5B showing, for the front wheel side and the rear wheel side, respectively, the relation between estimative steering angles estimated on the basis of the Ackermann Jeantaud theory and actual steering angles detected by an experiment.

However, as shown in FIG. 5A, which schematically shows results of an experiment, when the left and right front wheels WfL and WfR (steerable wheels) are steered to the vicinity of the maximum steering angle, the Ackermann ratio decreases due to the suspension geometric characteristic of the vehicle, and the linearity of the relation between the estimative steering angle and the actual steering angle cannot be maintained. That is, when the left and right front wheels WfL and WfR (steerable wheels) are steered to the vicinity of the maximum steering angle, the Ackermann Jeantaud theory does not stand. Therefore, if the front-wheel-side estimative steering angle θFr is computed on the basis of the Ackermann Jeantaud theory, for example, in accordance to the above-mentioned Eq. (1), the estimation accuracy decreases, especially near the maximum steering angle.

In contrast, the Fr estimative steering angle computation section 42 computes the front-wheel-side estimative steering angle θFr in accordance with the above-mentioned Eq. (4) which uses the overall gear ratio GR of the vehicle which is determined on the basis of the suspension geometric characteristic of the vehicle. In particular, the change in the Ackermann angle αR of the inner steerable wheel (right wheel WfR in FIG. 18) and the change in the Ackermann angle αL of the outer steerable wheel (left wheel WfL in FIG. 18) at the time when the left and right front wheels WfL and WfR are steered to the vicinity of the maximum steering angle can be corrected (complemented) by use of the overall gear ratio GR. Therefore, the impact of reduction in the Ackermann ratio on the computation of the front-wheel-side estimative steering angle θFr can be diminished. Accordingly, the accuracy of estimative computation of the front-wheel-side estimative steering angle θFr can be improved by causing the Fr estimative steering angle computation section 42 to compute the front-wheel-side estimative steering angle θFr in accordance with the above-mentioned Eq. (4).

The Rr estimative steering angle computation section 43 computes a rear-wheel-side estimative steering angle θRr (i.e., a second steering angle) using wheel speeds ωrL_LPF and ωrR_LPF represented by the signals received from the LPF processing section 41. That is, the Rr estimative steering angle computation section 43 computes the rear-wheel-side estimative steering angle θRr in accordance with the following Eq. (5):

$$\theta Rr = GR \times \arctan\left\{\frac{2L}{W} \times \left(\frac{\omega rL\_LPF - \omega rR\_LPF}{\omega rL\_LPF + \omega rR\_LPF}\right)\right\} \quad \text{Eq. (5)}$$

Note that the second term on the right side of the above Eq. (5) is substantially the same as that of the above-mentioned Eq. (2) which is based on the Ackermann Jeantaud theory. In the above Eq. (5), GR is a constant which represents the overall gear ratio of the vehicle just like the above-mentioned Eq. (4).

Meanwhile, accuracy of computation of the rear-wheel-side estimative steering angle θRr can also be improved by taking into account the overall gear ratio GR of the vehicle. This will be described hereinafter.

In the present embodiment, the left and right rear wheels WrL and WrR are not steered. Therefore, when the left and right front wheels WfL and WfR (steerable wheels) are steered to turn the vehicle, the left and right rear wheels WrL and WrR are apt to move tangentially along the respective concentric circles sharing the common turning center in accordance with the Ackermann Jeantaud theory.

Figure 5B:
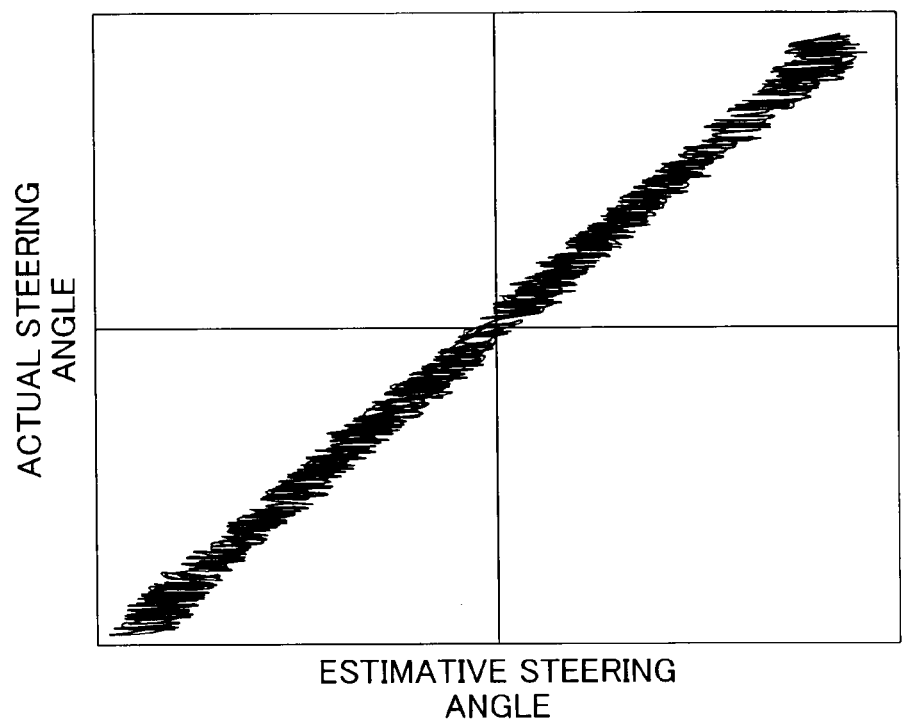

That is, since the left and right rear wheels WrL and WrR are not steered, they move along the concentric circles while being dragged as the vehicle turns. As shown in FIG. 5B, which schematically shows results of an experiment, if the steering angles of the left and right front wheels WfL and WfR are computed using the wheel speeds ωrL_LPF and ωrR_LPF of the left and right rear wheels WrL and WrR, the Ackermann ratio does not change and the linearity can be maintained at all times; however, the hysteresis width corresponding to deviations of the left and right rear wheels WrL and WrR from the respective concentric circles increases due to dragging of the left and right rear wheels WrL and WrR. Furthermore, in the case where the left and right rear wheels WrL and WrR are drive wheels, their deviations from the respective concentric circles are also likely to occur due to transmission of drive forces, and the hysteresis width increases. Accordingly, when the rear-wheel-side estimative steering angle θRr is computed using, for example, the above-described Eq. (2) which is based on Ackermann Jeantaud theory, the linearity of the Ackermann ratio can be maintained properly, but the estimation accuracy decreases due to the large hysteresis width.

In contrast, the Rr estimative steering angle computation section 43 computes the rear-wheel-side estimative steering angle θRr in accordance with the above-mentioned Eq. (5) which uses the overall gear ratio GR of the vehicle. Thus, correcting (complementing) operation is performed such that the hysteresis width corresponding to the deviations from the respective concentric circles decreases. Accordingly, the estimation accuracy can be enhanced by causing the Rr estimative steering angle computation section 43 to compute the rear-wheel-side estimative steering angle θRr in accordance with the above-mentioned Eq. (5).

As mentioned above, the Fr estimative steering angle computation section 42 and the Rr estimative steering angle computation section 43 estimate or compute the front-wheel-side estimative steering angle θFr and the rear-wheel-side estimative steering angle θRr through use of the wheel speeds ωfL_LPF, ωfR_LPF, ωrL_LPF, and ωrR_LPF. That is, the front-wheel-side estimative steering angle θFr and the rear-wheel-side estimative steering angle θRr can be computed when the vehicle is traveling and the left and right front wheels WfL and WfR and the left and right rear wheels WrL and WrR are rotating in the moving direction of the vehicle.

Therefore, when the left and right front wheels WfL and WfR are steered, for example, in a situation where the vehicle is in the stopped state and the wheel speed sensors 31*a* to 31*d* cannot detect the wheel speeds ωfL_LPF, ωfR_LPF, ωrL_LPF, and ωrR_LPF (when so-called stationary steering is performed), estimative computation of the front-wheel-side estimative steering angle θFr and the rear-wheel-side estimative steering angle θRr becomes impossible. In the case where the front-wheel-side estimative steering angle θFr and rear-wheel-side estimative steering angle θRr are computed immediately after the vehicle, which has been in a stopped state, starts traveling and the wheel speed sensors 31*a* to 31*d* become able to detect the wheel speeds ωfL_LPF, ωfR_LPF, ωrL_LPF, and ωrR_LPF, the front-wheel-side estimative steering angle θFr and rear-wheel-side estimative steering angle θRr may be estimated or computed with a large error.

Accordingly, the Fr estimative steering angle computation section 42 and the Rr estimative steering angle computation section 43 receive a signal representing the vehicle speed V detected by the vehicle speed sensor 34 respectively, and set the front-wheel-side estimative steering angle θFr and the rear-wheel-side estimative steering angle θRr to "0" when the vehicle speed V represented by the received signal becomes equal to or lower than a speed at which the wheel speed sensors 31*a* to 31*d* can detect the respective wheel speeds. When the vehicle speed V becomes higher than the speed at which the wheel speed sensors 31*a* to 31*d* can detect the respective wheel speeds after it has become equal to or lower than the speed at which the wheel speed sensors 31*a* to 31*d* can detect the respective wheel speeds, the Fr estimative steering angle computation section 42 and the Rr estimative steering angle computation section 43 set the front-wheel-side estimative steering angle θFr and the rear-wheel-side estimative steering angle θRr to "0" until a predetermined time elapses.

This prevents the front-wheel-side estimative steering angle θFr and the rear-wheel-side estimative steering angle θRr from being computed with a large error even when the state in which the front-wheel-side estimative steering angle θFr and the rear-wheel-side estimative steering angle θRr cannot be obtained due to stoppage of the vehicle changes to the state in which the front-wheel-side estimative steering angle θFr and the rear-wheel-side estimative steering angle θRr can be computed through estimation. Accordingly, this also contributes to the improvement of accuracy of estimative computation of the front-wheel-side estimative steering angle θFr and the rear-wheel-side estimative steering angle θRr.

As described above, after computing the front-wheel-side estimative steering angle θFr and the rear-wheel-side estimative steering angle θRr, the Fr estimative steering angle computation section 42 and the Rr estimative steering angle computation section 43 send the computed front-wheel-side estimative steering angle θFr and the rear-wheel-side estimative steering angle θRr to a control steering angle computation section 44.

The control steering angle computation section 44 receives the front-wheel-side estimative steering angle θFr computed by the Fr estimative steering angle computation section 42 and the rear-wheel-side estimative steering angle θRr computed by the Rr estimative steering angle computation section 43. Next, the control steering angle computation section 44 computes an estimative steering angle θc by averaging the front-wheel-side estimative steering angle θFr and the rear-wheel-side estimative steering angle θRr in accordance with the following Eq. (6):

$$\theta c = \frac{\theta Fr + \theta Rr}{2} \qquad \text{Eq. (6)}$$

As mentioned above, since the estimative steering angle θc is computed through use of the front-wheel-side estimative steering angle θFr and the rear-wheel-side estimative steering angle θRr, there can be formed a robust redundant system which is less likely to be affected by anomaly of any one of the wheel speeds ωfL_LPF, ωfR_LPF, ωrL_LPF, and ωrR_LPF. In addition, since the estimative steering angle θc is computed by averaging the front-wheel-side estimative steering angle θFr and the rear-wheel-side estimative steering angle θRr in accordance with the above Eq. (6), it is possible to further prevent impairment of the accuracy of estimative calculation, which impairment would otherwise occur due to the above-described suspension geometric characteristic. Accordingly, the accuracy in computing the estimative steering angle θc through estimation can be improved.

In addition, the control steering angle computation section 44 obtains an estimative steering angle difference Δθ by calculating the difference between the front-wheel-side estimative steering angle θFr and the rear-wheel-side estimative steering angle θRr in accordance with the following Eq. (7):

$$\Delta\theta = \theta Fr - \theta Rr \qquad \text{Eq. (7)}$$

After completion of computation of the estimative steering angle θc and the estimative steering angle difference Δθ by the control steering angle computation section 44, the steering angle estimation section 40 sends the estimative steering angle θc and the motor rotational angular speed Θ' to the axial force estimation section 50, and sends the estimative steering angle difference Δθ to the assist torque computation section 60 (more specifically, an assist torque correction section 63 to described later).

Figure 6:
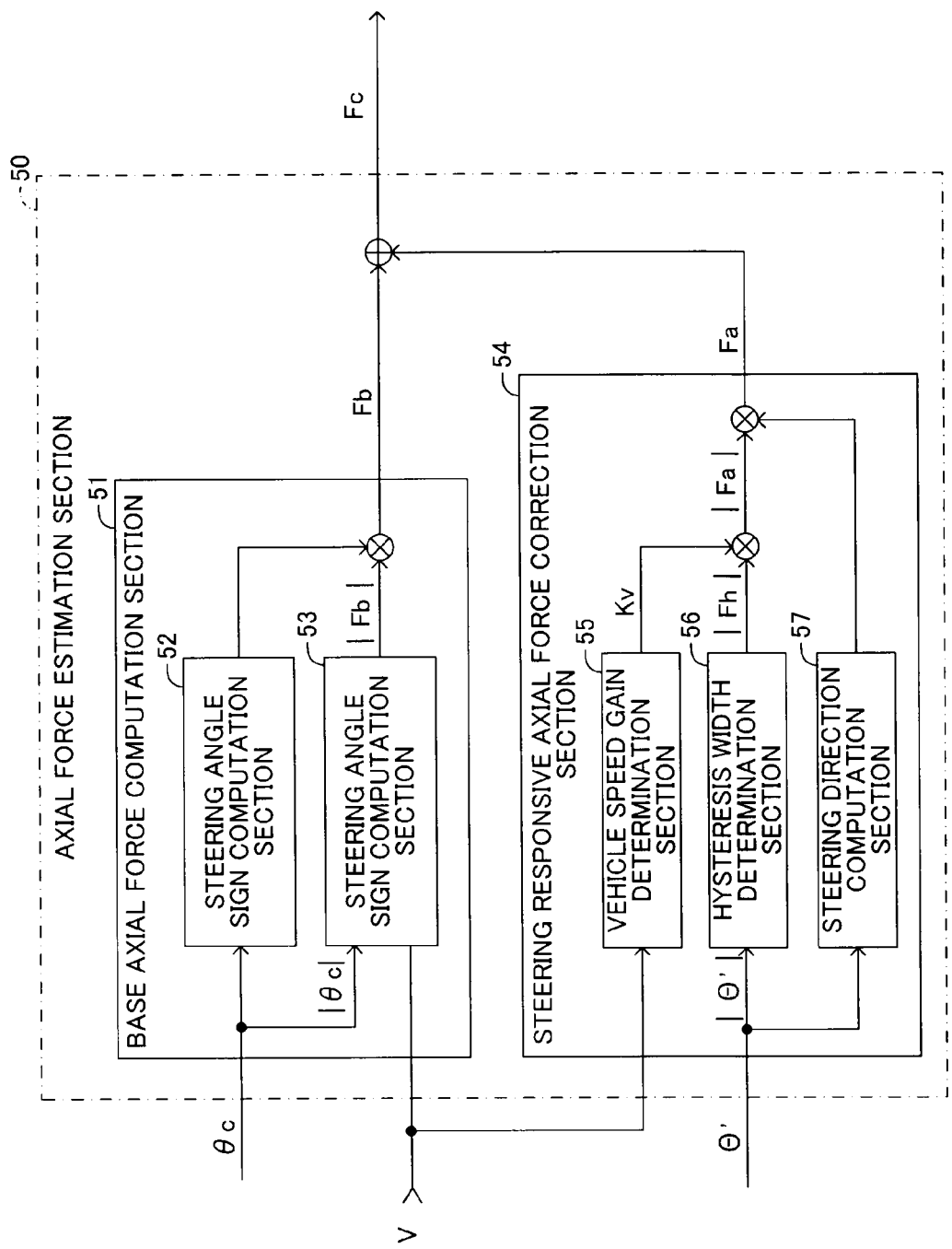
FIG. 6 is a block diagram representing control processing executed by an axial force estimation section of FIG. 2.

As shown in FIG. 6, in the axial force estimation section 50, a base axial force computation section 51 computes a base axial force Fb—which is applied from the steered left and right front wheels WfL and WfR to the rack bar 22 via the knuckles 24 and tie rods 23—through use of the estimative steering angle θc received from the steering angle estimation section 40 and the vehicle speed V detected by the vehicle speed sensor 34. Hence, the base axial force computation section 51 includes a steering angle sign computation section 52 which determines the sign (+ or −) of the estimative steering angle θc received from the control steering angle computation section 44 (i.e., the steering direction of the left and right front wheels WfL and WfR in relation to the neutral position) and a base axial force determination section 53 which determines the magnitude (absolute value) of the base axial force Fb applied to the rack bar 22 as a result of steering of the left and right front wheels WfL and WfR, through use of the magnitude (absolute value) of the estimative steering angle θc.

Figure 7:
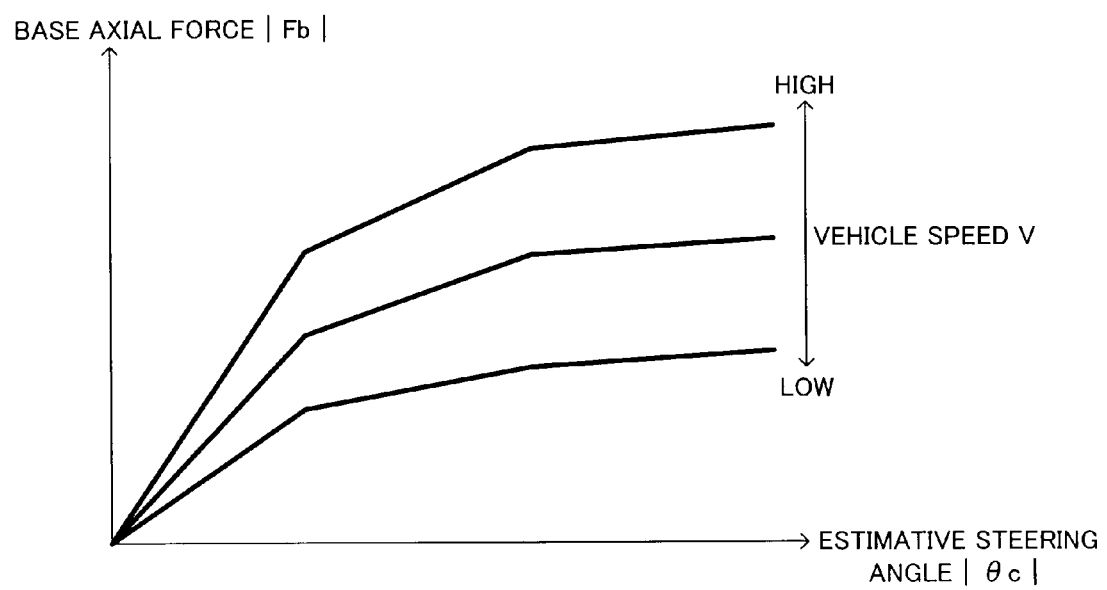
FIG. 7 is a graph showing the relation among the estimative steering angle estimated by the steering angle estimation section, vehicle speed, and base axial force.

The base axial force determination section 53 refers to a base axial force map shown in FIG. 7 so as to determine the base axial force Fb corresponding to the estimative steering angle θc received from the control steering angle computation section 44. Notably, the base axial force map represents the relationship that the base axial force Fb increases with an increase in the absolute value of the estimative steering angle θc and the relationship that the base axial force Fb increases with an increase in the vehicle speed V detected by the vehicle speed sensor 34, and decreases with a decrease in the vehicle speed V. Alternatively, instead of referring to the base axial force map, the base axial force Fb may be computed through use of a function defining the base axial force Fb which changes with the estimative steering angle θc and the vehicle speed V.

Hence, the base axial force determination section 53 determines a base axial force map on the basis of the received vehicle speed V, and determines, through use of the determined base axial force map, the magnitude (absolute value) of the base axial force Fb corresponding to the absolute value of the estimative steering angle θc received from the control steering angle computation section 44. The base axial force computation section 51 then computes the base axial force Fb, on which the steering direction of the left and right front wheels WfL and WfR is reflected, by multiplying the sign (corresponding to the steering direction of the left and right front wheels WfL and WfR in relation to the neutral position) of the estimative steering angle θc determined by the steering angle sign computation section 52 by the base axial force Fb (absolute value) determined by the base axial force determination section 53.

Meanwhile, the base axial force Fb is determined from the steering direction of the left and right front wheels WfL and WfR and the estimative steering angle θc (absolute value). In other words, the base axial force Fb is determined irrespective of whether the driver turns the steering wheel 11 such that the steering angle (absolute value) of the left and right front wheels WfL and WfR increases (hereinafter this operation may be simply referred to "wheel turning operation") or returns the steering wheel 11 such that the steering angle (absolute value) of the left and right front wheels WfL and WfR decreases (hereinafter this operation may be simply referred to "wheel returning operation"). If the assist torque computation section 60 to be described later computes the assist torque Ta using only the base axial force Fb determined in accordance with the estimative steering angle θc (absolute value) as mentioned above, the driver may sometimes feel unnatural sensation against a torque change which the driver senses when turning or returning the steering wheel 11. This will be described below.

Here, under the assumption that the left and right front wheels WfL and WfR have been steered from their neutral positions to an estimative steering angle θc1 which is a rightward angle with respect to the longitudinal direction of the vehicle, there will be considered a case where the driver turns the steering wheel 11 such that the above-mentioned steering angle increases and a case where the driver returns the steering wheel 11 such that the above-mentioned steering angle decreases. In these cases, immediately before the driver turns or returns the steering wheel 11, the base axial force determination section 53 has determined a base axial force Fb1 (absolute value) which corresponds to, for example, the estimative steering angle θc1 (absolute value) by referring to the base axial force map.

When the driver turns the steering wheel 11 such that the above-mentioned steering angle increases, the left and right front wheels WfL and WfR are steered to an estimative steering angle θc2 whose absolute value is greater than that of the estimative steering angle θc1. As a result, the base axial force determination section 53 determines a base axial force Fb2 (absolute value) whose absolute value is greater than that of the base axial force Fb1, from the estimative steering angle θc2 (absolute value). Meanwhile, when the driver returns the steering wheel 11, the left and right front wheels WfL and WfR are steered to an estimative steering angle θc3 whose absolute value is smaller than that of the estimative steering angle θc1. As a result, the base axial force determination section 53 determines a base axial force Fb3 (absolute value) whose absolute value is smaller than that of the base axial force Fb1, from the estimative steering angle θc3 (absolute value).

That is, in the case where the left and right front wheels WfL and WfR that have been steered to the estimative steering angle θc1 are steered to the estimative steering angle θc2 as a result of the wheel turning operation and the case where the left and right front wheels WfL and WfR are steered to the estimative steering angle θc3 as a result of the wheel returning operation, the base axial forces Fb2 and Fb3 are determined such that they change from the base axial force Fb1, which serves as a reference, along a map curve in the base axial force map. In other words, in the situation exemplarily described above, the base axial force Fb2 and Fb3 determined by the base axial force determination section 53 change from the base axial force Fb1, which serves as a reference. Therefore, the base axial force Fb1 does not change depending on whether the driver turns or returns the steering wheel 11; that is, no axial force difference is produced between the wheel turning operation and the wheel returning operation.

Therefore, if the assist torque computation section 60 computes the assist torque Ta using the base axial force Fb only, the following problem occurs, because no axial force difference is produced. When the driver turns the steering wheel 11 (wheel turning operation), the driver must apply a large force (steering torque T) to the steering wheel 11 due to insufficiency of the assist torque Ta. In this case, the driver feels unnatural sensation against a torque change (i.e., the magnitude of the steering torque T) when he or she turns the steering wheel 11. Meanwhile, when the driver returns the steering wheel 11 (wheel returning operation), the applied assist torque Ta acts as so-called counter assist, and the steering wheel 11 becomes difficult to return to the neutral position. As a result, the driver feels unnatural sensation against a torque change (i.e., the magnitude of the steering torque T) when he or she returns the steering wheel 11.

As mentioned above, when only the base axial force Fb producing no difference in axial force is used, the driver may feel unnatural sensation against a torque change which the driver senses when he or she turns or returns the steering wheel 11. In other words, the above-described unnatural sensation felt by the driver can be reduced by means of imparting a hysteresis characteristic to the relation between the estimative steering angle θc and the base axial force Fb such that the pattern of changing of the base axial force Fb with changing of the estimative steering angle θc changes depending on whether the driver turns or returns the steering wheel 11.

Hence, the axial force estimation section 50 includes a steering responsive axial force correction section 54 which serves as correction assist torque computation means. The steering responsive axial force correction section 54 computes a correction axial force Fa which is used to correct the base axial force Fb to thereby reduce unnatural sensation against a torque change felt by the driver when he or she turns or returns the steering wheel 11. That is, the correction axial force Fa imparts a hysteresis characteristic to the relation between the estimative steering angle θc and the base axial force Fb such that the pattern of changing of the base axial force Fb with changing of the estimative steering angle θc changes depending on whether the driver turns or returns the steering wheel 11. Hereinafter, the correction axial force Fa will be specifically described using FIG. 8.

Figure 8:
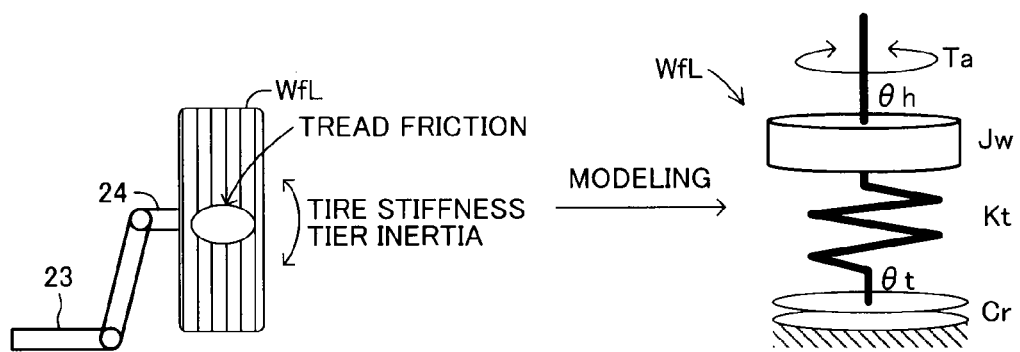
FIG. 8 is an explanatory view showing a dynamical relation at the time when steerable wheels are steered.

First, the mechanical relationship existing when the left and right front wheels WfL and WfR (steerable wheels) are steered will be considered before describing the correction axial force Fa. As shown in FIG. 8, which shows the left front wheel WfL representing the front wheels, the left front wheel WfL (right front wheel WfR) includes a tire which is in contact with the road surface via the tread thereof. When the left front wheel WfL (right front wheel WfR) is steered as a result of the driver's turning of the steering wheel 11, in general, friction at the tread (hereinafter referred to as tread friction), stiffness of the tire, and inertia of the tire are produced, and a force arising from these tread friction, tire stiffness, and tire inertia is applied to the rack bar 22 via the knuckle arm 24 and the tie rod 23.

Here, the mechanical relationship existing when the left front wheel WfL (right front wheel WfR) is steered with the applied assist torque Ta will be considered by modeling it. In this model, as shown in FIG. 8, when the knuckle arm 24 (i.e., a steering system including the steering wheel 11) rotates by a rotational angle of θh as a result of transmission of the assist torque Ta thereto, the following Eq. (8) is satisfied. In Eq. (8), Jw is an inertial moment of the tire, Kt is an elastic coefficient of the tire, θt is a deflection angle of the tire in relation to the road surface, and Cr is a viscous friction coefficient:

$$Jw \times \theta h'' + Cr \times \theta t' + Kt \times (\theta h - \theta t) - Ta = 0 \qquad \text{Eq. (8)}$$

In the above Eq. (8), the first term (Jw×θh") on the left-hand side relates to the inertial of the tire, and θh" is a second order differential value of the rotational angle θh (i.e., a rotational angular acceleration). When the left front wheel WfL (right front wheel WfR) is steered in accordance with the driver's operation of turning or returning the steering wheel 11, the term related to the inertia of the tire, which is represented by the first term (Jw×θh") on the left-hand side of the above Eq. (8), is always effective irrespective of the steered state of the left front wheel WfL (right front wheel WfR).

In the above Eq. (8), the third term (Kt×(θh−θt)) on the left-hand side relates to the stiffness of the tire. Since the third term (Kt×(θh−θt)) on the left-hand side and the fourth term (−Ta) on the left-hand side change depending on the steering angle of the left and right front wheels WfL and WfR. Therefore, they correspond to the base axial force Fb computed by the base axial force computation section 51.

Incidentally, in the above Eq. (8), the second term (Cr×θt') on the left-hand side represents the friction force between the tire and the road surface, and θt' is the differential value of the deflection angle θt (i.e., deflection angular speed; in other words, the steering speed of the tire). Therefore, the second term (Cr×θt") on the left-hand side of the above Eq. (8) is a friction force generated when the left front wheel WfL (right front wheel WfR) is steered at the steering angular speed θt' (i.e., the motor rotational angular speed Θ'), and changes depending on whether the driver turns or returns the steering wheel 11. Accordingly, by means of determining the correction axial force Fa on the basis of the above-described friction force, a hysteresis characteristic can be imparted to the relation between the estimative steering angle θc and the base axial force Fb such that the pattern of changing of the base axial force Fb with changing of the estimative steering angle θc changes depending on whether the driver turns or returns the steering wheel 11.

The viscous friction coefficient Cr changes with the contact area of the tire at the time when the left front wheel WfL (right front wheel WfR) is steered. That is, the viscous friction coefficient Cr is represented by the product of the static friction coefficient μ between the tire and the road surface and a normal reaction force N(V). The normal reaction N(V) is represented as a function of the vehicle speed V. Since the contact area of the tire changes depending on the vehicle speed V, it is large when the vehicle speed V is low, and small when the vehicle speed V is high. Consequently, the normal reaction force N (V) is large when the vehicle speed V is low, and is small when the vehicle speed V is high. Therefore, the viscous friction coefficient Cr changes depending on the vehicle speed V; that is, it is large when the vehicle speed V is low, and small when the vehicle speed V is high.

Accordingly, the friction force generated when the left front wheel WfL (right front wheel WfR) is steered at the steering angular speed θf (i.e., the motor rotational angular speed Θ') can be considered to be the product of the viscous friction coefficient Cr which changes depending on the vehicle speed V and the speed at which the driver turns the steering wheel 11 (i.e., the motor rotational angular speed Θ').

As mentioned above, in order to determine the correction axial force Fa on the basis of the friction force applied in accordance with the steered state of the left and right front wheels WfL and WfR (specifically, whether the driver turns or returns the steering wheel 11), the steering responsive axial force correction section 54 includes, as shown in FIG. 6, a vehicle speed gain determination section 55, a hysteresis width determination section 56, and a steering direction computation section 57 which determines the sign of the motor rotational angular speed Θ' received from the LPF processing section 41 of the steering angle estimation section 40 (i.e., determining whether the driver turns or returns the steering wheel 11).

Figure 9:
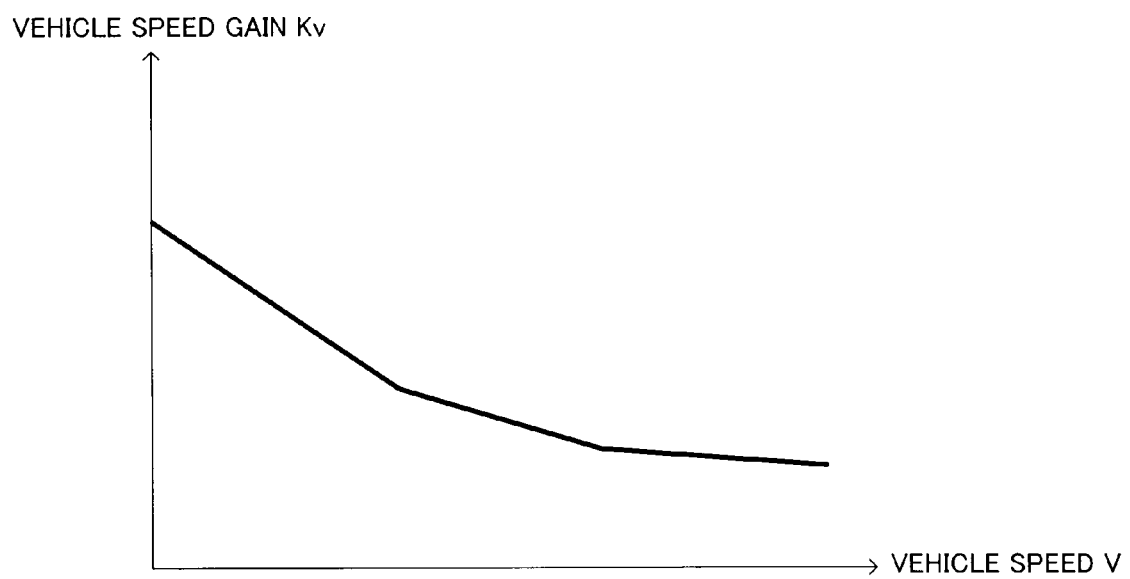
FIG. 9 is a graph showing the relation between vehicle speed and vehicle speed gain.

The vehicle speed gain determination section 55 determines a vehicle speed gain Kv which relates to a change in the magnitude of the contact area that changes depending on the vehicle speed V as described above; i.e., the viscous friction coefficient Cr in the above-described Eq. (8). Specifically, the vehicle speed gain determination section 55 receives a signal representing the vehicle speed V detected by the vehicle speed sensor 34. Subsequently, the vehicle speed gain determination section 55 determines the vehicle speed gain Kv corresponding to the vehicle speed V represented by the received signal by referring to the vehicle speed gain map shown in FIG. 9. Note that the vehicle gain map shows the relationship between the vehicle gain Kv and the detected vehicle speed V determined such that the vehicle gain Kv decreases as the detected vehicle speed V increases. Notably, instead of referring to the vehicle gain map, the base axial force Fb may be computed through use of a function which defines the vehicle gain Kv which changes with the vehicle speed V.

Figure 10:
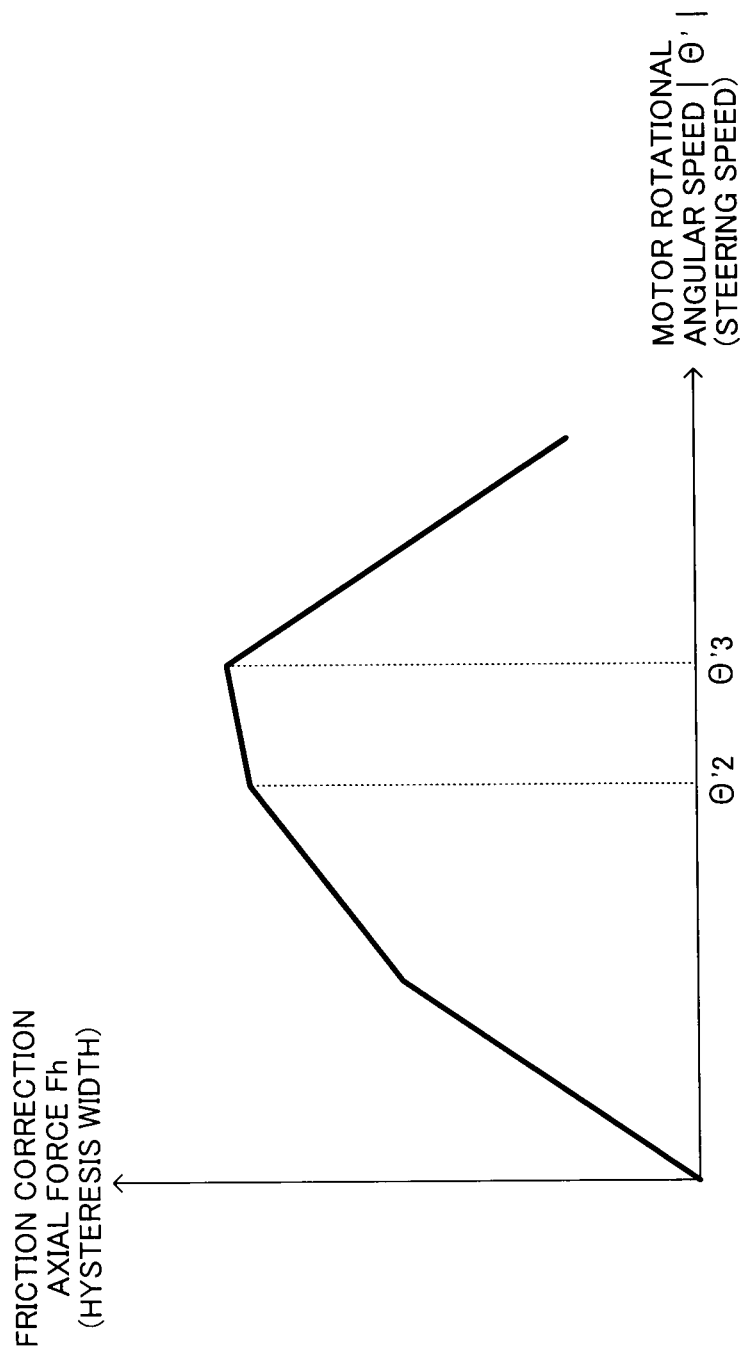
FIG. 10 is a graph showing the relation between steering speed (motor rotational angular speed) and friction correction axial force (hysteresis width).

The hysteresis width determination section 56 determines a hysteresis width which determines the hysteresis characteristic imparted to the relation between the estimative steering angle θc and the base axial force Fb. The hysteresis width determination section 56 determines a friction correction axial force Fh corresponding to the hysteresis width by referring to the hysteresis width determination map shown in FIG. 10. Notably, the hysteresis width determination map shows the relation between the motor rotational angular speed Θ' and the friction correction axial force Fh determined such that the friction correction axial force Fh increases (i.e., the hysteresis width increases) when the absolute value of the motor rotational angular speed Θ' computed by the LPF processing section 41 of the steering angle estimation section 40 is less than a predetermined rotational angular speed Θ'2, and the friction correction axial force Fh decreases (i.e., the hysteresis width decreases) when the absolute value of the motor rotational angular speed Θ' is equal to or greater than a predetermined rotational angular speed Θ'3 which is greater than the predetermined rotational angular speed Θ'2. Accordingly, the hysteresis width determination section 56 uses this hysteresis width determination map so as to determine the hysteresis width (i.e., the magnitude (absolute value) of the friction correction axial force Fh) corresponding to the absolute value of the motor rotational angular speed Θ' received from the above-described LPF processing section 41.

Notably, instead of referring to the above-described hysteresis width determination map, there may be used a function which defines the relation between the motor rotational angular speed Θ' and the friction correction axial force Fh. The function is defined such that the friction correction axial force Fh increases when the motor rotational angular speed Θ' is less than the predetermined rotational angular speed Θ'2, and decreases when the motor rotational angular speed Θ' is equal to or greater than the rotational angular speed Θ'3. The friction correction axial force Fh is determined through use of the function defined as described above.

The steering responsive axial force correction section 54 determines the correction axial force Fa (absolute value) by multiplying together the vehicle speed gain Kv determined by the vehicle speed gain determination section 55 and the friction correction axial force Fh (absolute value) determined by the hysteresis width determination section 56. In addition, the steering responsive axial force correction section 54 determines the correction axial force Fa, in consideration of the steered state of the left and right front wheels WfL and WfR, by multiplying together the correction axial force Fa (absolute value) and the sign (corresponding to the direction in which the driver turns the steering wheel 11) of the motor rotational angular speed Θ' determined by the steering direction computation section 57.

Figure 11:
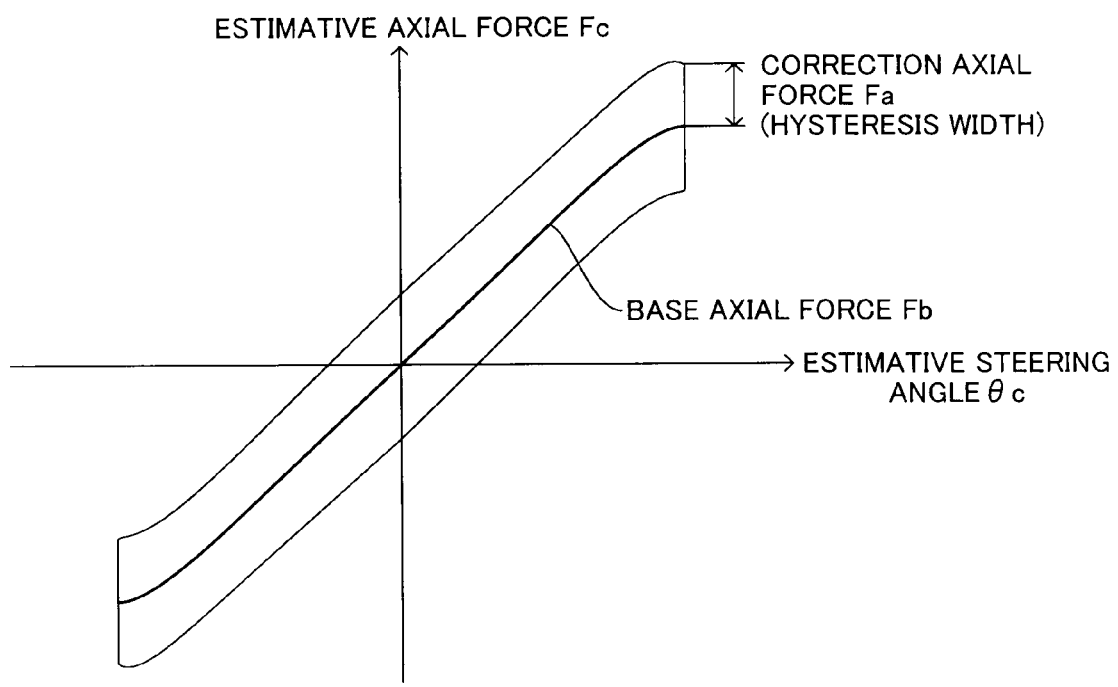
FIG. 11 is a graph showing the relation between the estimative steering angle estimated by the steering angle estimation section and estimative axial force.

After completion of the above-described computation of the base axial force Fb by the base axial force computation section 51 and the above-described computation of the correction axial force Fa by the steering responsive axial force correction section 54, the axial force estimation section 50 computes an estimative axial force Fc by adding together the computed base axial force Fb and the correction axial force Fa. Notably, as shown in FIG. 11, the estimative axial force Fc computed as mentioned above is equal to that obtained by adding together a hysteresis width (axial force difference) represented by the correction axial force Fa and the base axial force Fb which changes with the estimative steering angle θc. In this case, as mentioned above, the correction axial force Fa changes with the magnitude of the motor rotational angular speed Θ'; namely, the steering speed, and the vehicle speed V. Since the estimative axial force Fc is computed in consideration of the correction axial force Fa, the estimative axial force Fc can be estimated or computed more accurately, also taking into account the driver's operation of turning or returning the steering wheel 11. Next, the axial force estimation section 50 sends the computed estimative axial force Fc to the assist torque computation section 60.

Figure 12:
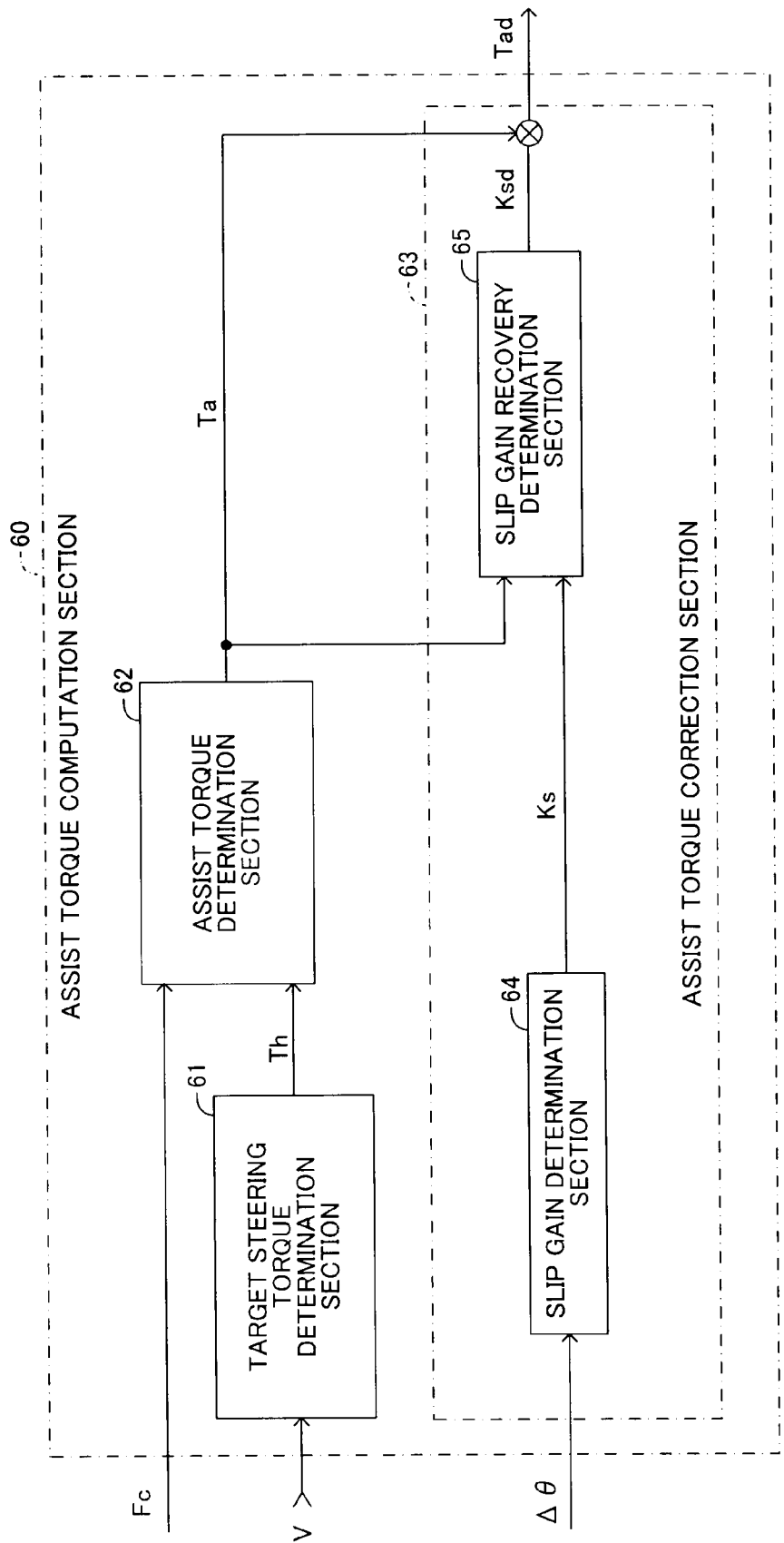
FIG. 12 is a block diagram representing control processing executed by an assist torque computation section of FIG. 2.

As shown in FIG. 12, the assist torque computation section 60 includes a target steering torque determination section 61, an assist torque determination section 62, and an assist torque correction section 63 which serves as assist force correction means.

The target steering torque determination section 61 determines a target steering torque Th to be applied by the driver via the steering wheel 11. Specifically, the target steering torque determination section 61 determines the target steering torque Th such that the steering torque T applied to the steering wheel 11 by the driver is low while the vehicle is moving at low speed, and is relatively high while the vehicle is moving at medium or high speed.

Figure 13:
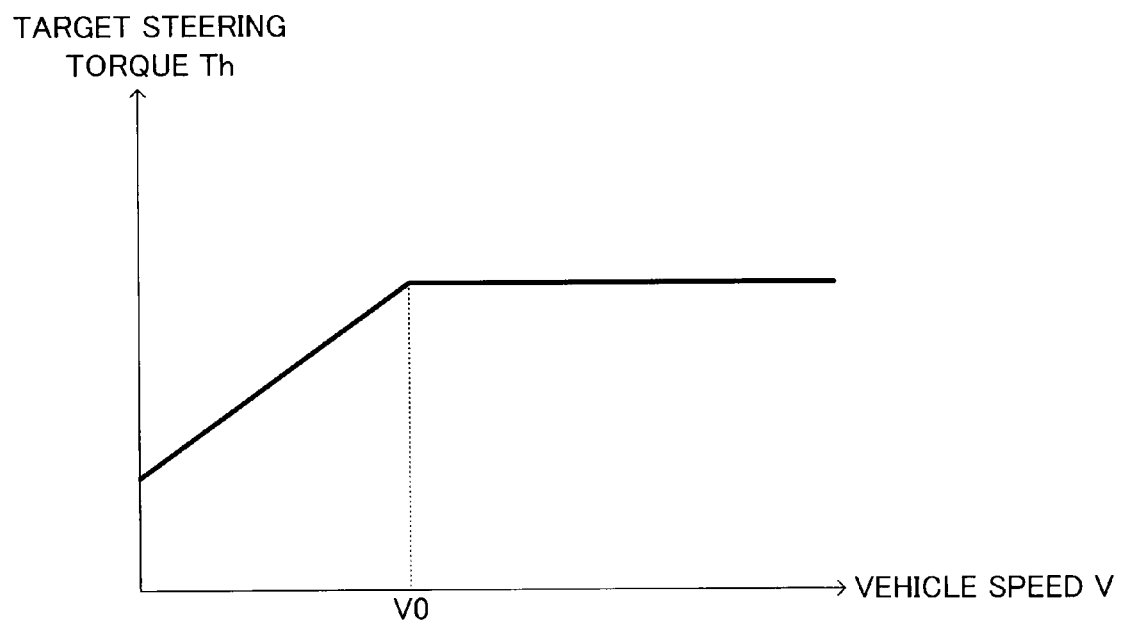
FIG. 13 is a graph showing the relation between vehicle speed and target steering torque.

For this purpose, the target steering torque determination section 61 receives the vehicle speed V detected by the vehicle speed sensor 34. Next, the target steering torque determination section 61 determines the target steering torque Th corresponding to the received vehicle speed V by referring to the target steering torque determination map shown in FIG. 13. Notably, the target steering torque determination map shows a relation between the received vehicle speed V and the target steering torque Th. That is, the relation is determined such that the target steering torque Th increases linearly when the received vehicle speed V is equal to or higher than "0" but lower than a predetermined vehicle speed V0, and is maintained constant when the received vehicle speed V is equal to or higher than the predetermined vehicle speed V0. Notably, instead of referring to the above-described target steering torque determination map, there may be used a function which defines the relation between the received vehicle speed V and the target steering torque Th. The function is defined such that the target steering torque Th increases linearly when the received vehicle speed V is lower than the predetermined vehicle speed V0, and is maintained constant when the received vehicle speed V is equal to or higher than the predetermined vehicle speed V0. The target steering torque Th is determined through used of the function defined as described above. Subsequently, the target steering torque determination section 61 sends the determined target steering torque Th to the assist torque determination section 62.

Figure 14:
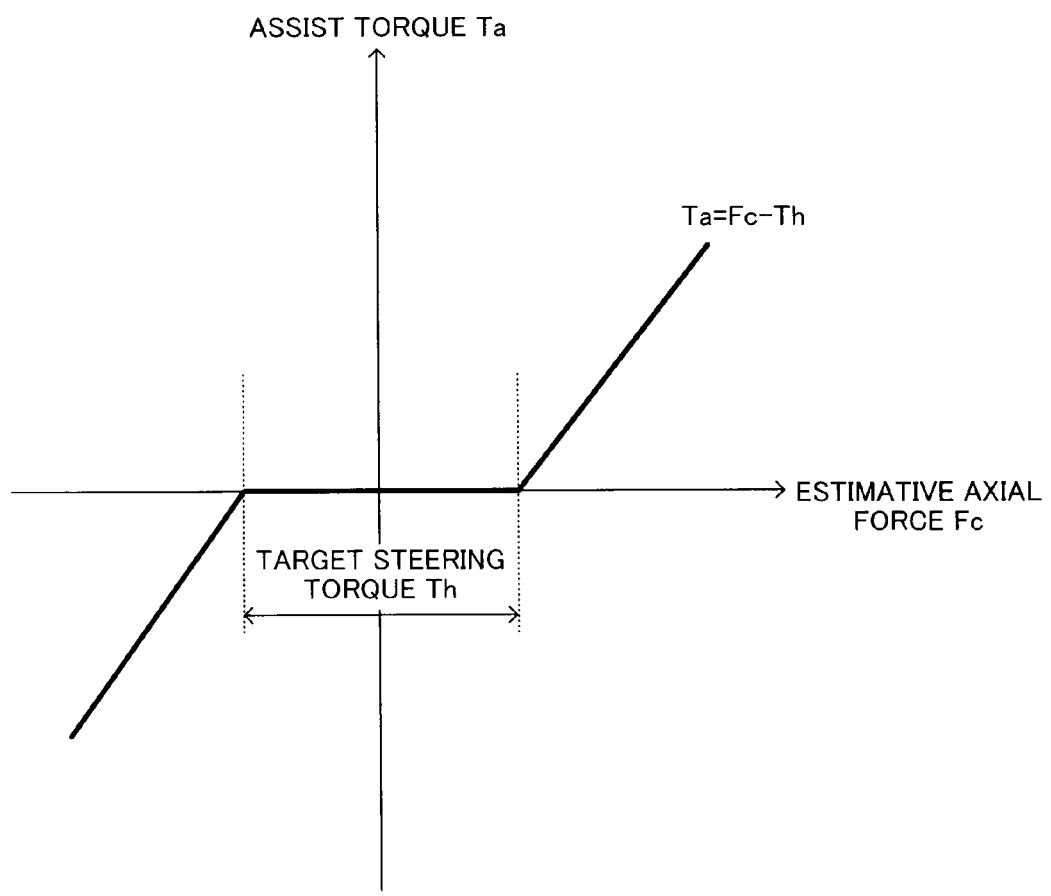
FIG. 14 is a graph showing the relation between the estimative axial force estimated by the axial force estimation section and assist torque.

The assist torque determination section 62 determines the assist torque Ta such that the driver can turn the steering wheel 11 with the target steering torque Th, against the estimative axial force Fc computed by the axial force estimation section 50. Specifically, the assist torque determination section 62 compares the estimative axial force Fc (absolute value) received from the axial force estimation section 60 with the target steering torque Th (absolute value) received from the target steering torque determination section 61. That is, as shown in FIG. 14, when the estimative axial force Fc (absolute value) is less than the target steering torque Th (absolute value), the assist torque determination section 62 sets the assist torque Ta to "0". On the other hand, as shown in FIG. 14, when the estimative axial force Fc (absolute value) is greater than the target steering torque Th (absolute value), the assist torque determination section 62 obtains the assist torque Ta by subtracting the target steering torque Th from the estimative axial force Fc in accordance with the following Eq. (9):

$$Ta = Fc - Th \qquad \text{Eq. (9)}$$

As mentioned above, when the estimative axial force Fc is small, the assist torque Ta is set to "0" because the amount of driver's operation of turning the steering wheel 11 is small. Thus, in the region where the assist torque Ta is set to "0", the assist torque Ta is not applied even if the driver turns the steering wheel 11. This region is a so-called dead band. When the driver turns the steering wheel 11 beyond the dead band, that is, when the estimative axial force Fc has become greater than the target steering torque Th, the minimum assist torque Ta is applied.

As mentioned above, the target steering torque Th is set to a small value when the vehicle speed V is lower than the predetermined vehicle speed V0, and set to a fixed value when the vehicle speed V is equal to or higher than the predetermined vehicle speed V0. Therefore, in a low-speed range where the vehicle speed V is lower than the predetermined vehicle speed V0, the target steering torque Th is set to a small value. As a result, a narrow dead band is provided. Accordingly, the assist torque Ta (corrected assist torque Tad) is applied quickly in accordance with the turning operation of the steering wheel 11 performed by the driver. That is, when the vehicle is traveling in the low-speed range, the driver can turn the steering wheel 11 every easily and maneuver the vehicle satisfactorily.

On the other hand, the target steering torque Th is set to a large fixed value in the medium- and high-speed ranges where the vehicle speed V is equal to or higher than the predetermined vehicle speed V0. As a result, a wide dead ban is provided. Accordingly, the assist torque Ta (corrected assist torque Tad) is applied slowly in accordance with the turning operation of the steering wheel 11 performed by the driver. That is, when the vehicle is moving in a medium- or high-speed range, the driver can turn the steering wheel 11 while feeling a firm reaction via the steering wheel 11. As a result, the driver can stabilize the vehicle behavior through stable operation of turning the steering wheel 11.

The assist torque correction section 63 computes the corrected assist torque Tad by correcting the assist torque Ta determined by the assist torque determination section 62 when slippage is occurring on at least one of the left and right front wheels WfL and the WfR and the left and right rear wheels WrL and WrR. Specifically, in a situation where slippage is occurring on at least one of the left and right front wheels WfL and the WfR and left and right rear wheels WrL and WrR, the assist torque correction section 63 corrects the assist torque Ta determined by the assist torque determination section 62 so as to prevent excessive assist or self-steering of the left and right front wheels WfL and WfR which could otherwise occur when the assist torque Ta is applied. For this purpose, as shown in FIG. 12, the assist torque correction section 63 includes a slip gain determination section 64 which serves as slip gain determination means and a slip gain recovery determination section 65 which serve as slip gain recovery determination means.

Figure 15:
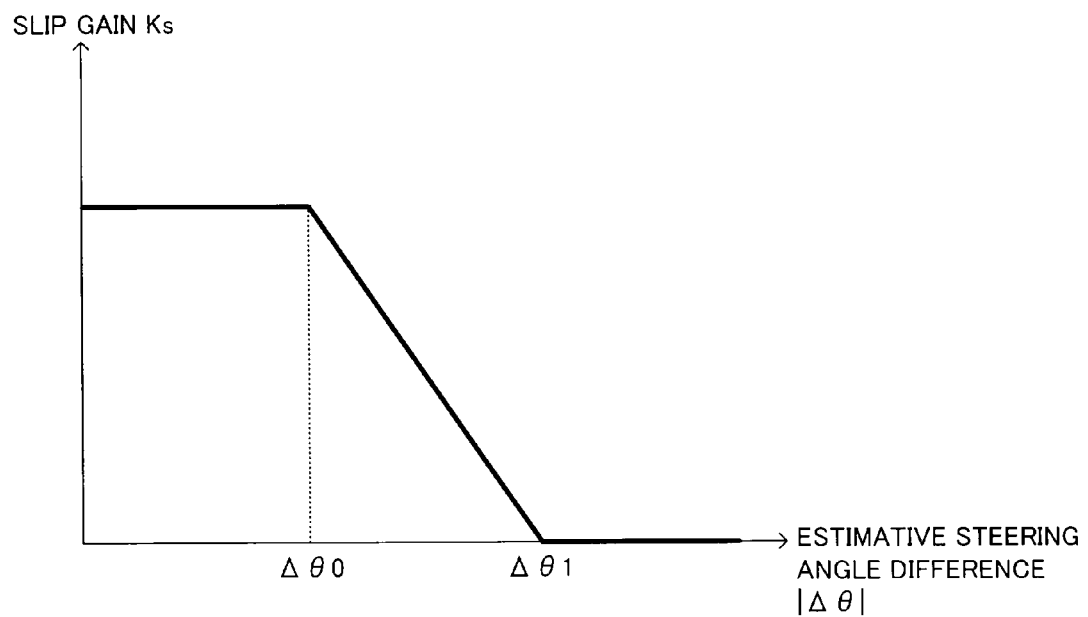
FIG. 15 is a graph showing the relation between the estimative steering angle difference estimated by the steering angle estimation section and slip gain.

The slip gain determination section 64 determines a slip gain Ks for correcting the assist torque Ta. Specifically, the slip gain determination section 64 receives the estimative steering angle difference $\Delta\theta$ computed by the control steering angle computation section 44 of the estimative steering angle computation section 40. That is, when slippage is occurring on at least one of the left and right front wheels WfL and WfR and the left and right rear wheels WrL and WrR, because of the difference in the above-described turning center between the left and right front wheels WfL and WfR and the left and right rear wheels WrL and WrR (shown in FIG. 18), the estimative steering angle difference $\Delta\theta$ increases. To solve this problem, the slip gain determination section 64 determines the slip gain Ks which corresponds to the absolute value of the estimative steering angle difference $\Delta\theta$ by referring to the slip gain determination map shown in FIG. 15.

Specifically, when the absolute value of the estimative steering angle difference $\Delta\theta$ received from the control steering angle computation section 44 is less than a predetermined steering angle difference $\Delta\theta 0$, the slip gain determination section 64 determines that slippage with an extremely low slip ratio is occurring on at least one of the left and right front wheels WfL and WfR and the left and right rear wheels WrL and WrR. In such a case, the slip gain determination section 64 sets the slip gain Ks to an upper limit value (specifically, "1"). Hereinafter, the state in which the slip gain Ks is set to the upper limit value "1" is referred to as a grip state.

In addition, when the absolute value of the received estimative steering angle difference $\Delta\theta$ is equal to or greater than the predetermined steering angle difference $\Delta\theta 0$ but less than the predetermined steering angle difference $\Delta\theta 1$, the slip gain determination section 64 determines that a relatively large slippage is occurring on at least one of the left and right front wheels WfL and WfR and the left and right rear wheels WrL and WrR. In such a case, the slip gain determination section 64 decreases the slip gain Ks linearly from the upper limit value toward the lower limit value (specifically, "0"), or increases linearly from the lower limit value toward the upper limit value, depending on whether the absolute value of the received estimative steering angle difference $\Delta\theta$ increases or decreases. In the following description, the state in which the slip gain Ks is set such that it decreases from "1" toward "0" is referred to as a slip start state, and the state in which the slip gain Ks is set such that it increases from "0" toward "1" is referred to as a slip recovery state.

Furthermore, when the absolute value of the received estimative steering angle difference $\Delta\theta$ is equal to or greater than the predetermined steering angle difference $\Delta\theta 1$, the slip gain determination section 64 determines that complete slippage (slip ratio: 1) is occurring at least one of the left and right front wheels WfL and WfR and the left and right rear wheels WrL and WrR. In such a case, the slip gain determination section 64 sets the slip gain Ks to the lower limit value (specifically, "0"). In the following description, the state in which the slip gain Ks is set to the upper limit value "0" is referred to as a complete slip state. Notably, instead of referring to the slip gain determination map, the slip gain Ks may be computed though use of a function defining the relation between the absolute value of the estimative steering angle difference $\Delta\theta$ and the slip gain Ks. The function is defined such that the slip gain Ks changes with the absolute value of the estimative steering angle difference $\Delta\theta$.

As mentioned above, the slip gain determination section 64 can determine the slip gain Ks in accordance with the absolute value of the estimative steering angle difference $\Delta\theta$. As mentioned later, by computing the corrected assist torque Tad obtained by correcting the assist torque Ta through use of the slip gain Ks, an appropriate assist torque Ta (corrected assist torque Tad) can be applied even when slippage is occurring on at least one of the left and right front wheels WfL and WfR and the left and right rear wheels WrL and WrR.

The slip gain recovery determination section 65 determines whether or not the slip gain Ks determined by the slip gain determination section 64 is to be output (recovered) by determining whether or not the rotating state of at least one of the left and right front wheels WfL and WfR and the left and right rear wheels WrL and WrR (hereinafter, simply referred to as a wheel) has changed from the complete slip state to the slip recovery state. Specifically, the slip gain recovery determination section 65 receives the assist torque Ta determined by the assist torque determination section 62, and receives the slip gain Ks from the slip gain determination section 64.

Figure 16:
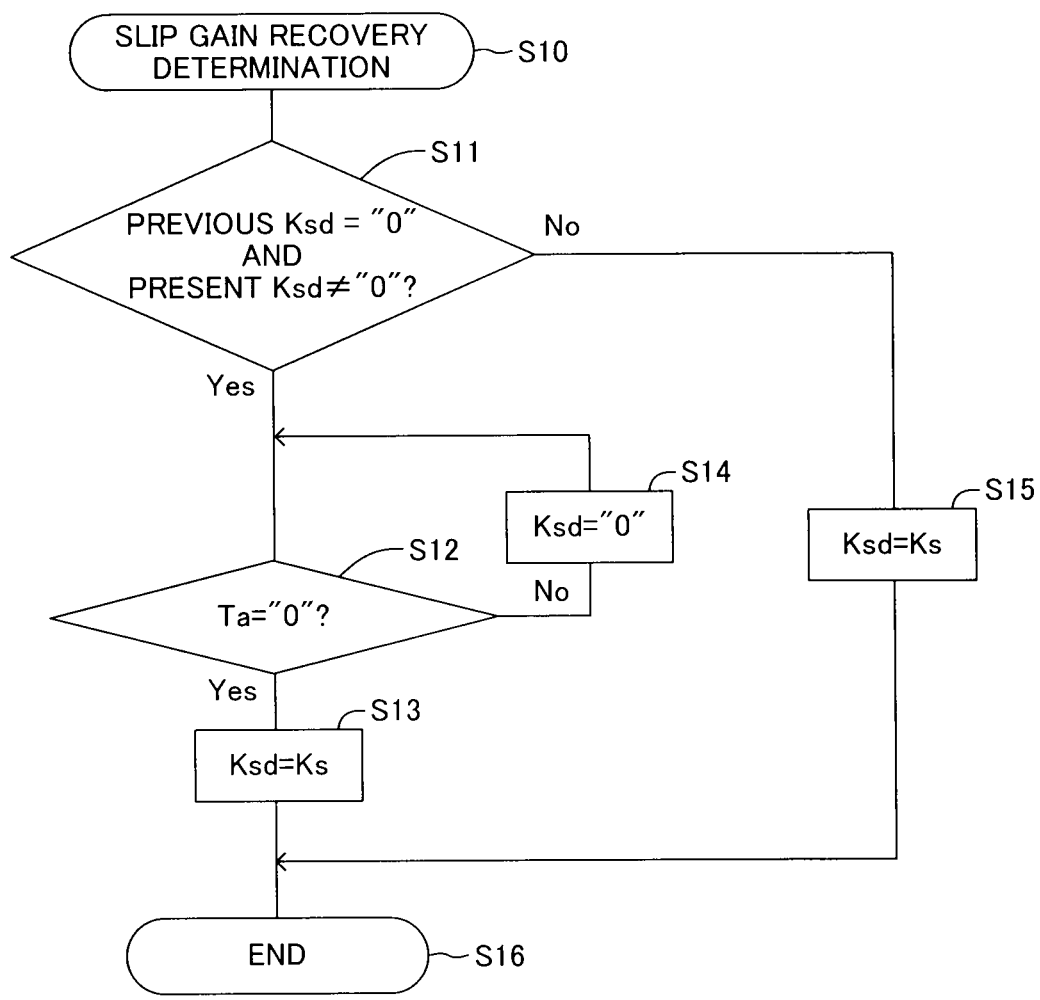
FIG. 16 is a flowchart showing a slip gain recovery determination program executed by a slip gain recovery determination section of FIG. 12.

Subsequently, the slip gain recovery determination section 65 determines whether the rotating state of a wheel has changed from the complete slip state to the slip recovery state by executing a slip gain recovery determination program shown in FIG. 16. In addition, by executing the slip gain recovery determination program, the slip gain recovery determination section 65 determines a final slip gain Ksd which indicates whether or not the slip gain Ks is to be output (recovered) in accordance with the rotating state (specifically, the complete slip state, slip recovery state, slip recovery state, or grip state) of the wheel. Hereafter, state change determination and determination of the final slip gain Ksd performed by the slip gain recovery determination section 65 will be described in detail.

In step S10, the slip gain recovery determination section 65 starts executing the program, and in the subsequent step S11, determines whether or not the rotating state of the wheel has changed from the complete slip state to the slip recovery state. Specifically, if the slip gain Ks received at the previous execution of the program is "0" and the slip gain Ks received at the present execution of the program is not "0", the slip gain recovery determination section 65 determines that the rotating state of the wheel has changed from the complete slip state to the slip recovery state. Accordingly, the slip gain recovery determination section 65 determines "Yes" in step S11, and then proceeds to step S12.

That is, in this case, the slip gain Ks received from the slip gain determination section 64 at the previous execution of the program is "0"; in other words, the estimative steering angle difference $\Delta\theta$ was equal to or greater than the predetermined steering angle difference $\Delta\theta 1$ and the rotating state of the wheel was a complete slip state. In contrast, the slip gain Ks received from the slip gain determination section 64 at the present execution of the program is not "0"; in other words, the estimative steering angle difference $\Delta\theta$ is less than the predetermined steering angle difference $\Delta\theta 1$, and the rotating state of the wheel is a slip recovery state (or a grip state).

On the other hand, if the slip gain Ks received at the previous execution of the program is not "0" and the Ks received at the present execution of the program is "0", the rotating state of the wheel is not a complete slip state, or the rotating state of the wheel is a complete slip state. Accordingly, the slip gain recovery determination section 65 determines "No" in step S11, and then proceeds to step S15. That is, in this case, the slip gain Ks received from the slip gain determination section 64 at the previous execution of the program is not "0"; in other words, the estimative steering angle difference $\Delta\theta$ is less than the predetermined steering angle difference $\Delta\theta 1$, and the rotating state of the wheel is a grip state, a slip start state, or a slip recovery state. Alternatively, the slip gain Ks received from the slip gain determination section 64 at the present execution of the program is "0"; in other words, the estimative steering angle difference $\Delta\theta$ is equal to or greater than the predetermined steering angle difference $\Delta\theta 1$, and the rotating state of the wheel is a complete slip state.

In step S12, the slip gain recovery determination section 65 determines whether or not the assist torque Ta received from the assist torque determination section 62 of the assist torque computation section 60 is "0". That is, when the assist torque computation section 62 sets the assist torque Ta to "0" as mentioned above because the estimative axial force Fc is equal to or less than the target steering torque Th; in other words, the estimative steering angle $\theta c$ of the left and right front wheels WfL and WfR (steerable wheels) is small, the slip gain recovery determination section 65 determines "Yes," and then proceeds to step S13.

In step S13, the slip gain recovery determination section 65 sets the final slip gain Ksd to the slip gain Ks determined by the slip gain determination section 64, and permits the output (recovery) of the slip gain Ks. That is, in this case, since the assist torque Ta is "0", no extra torque is added to the steering torque T, which is applied to the steering wheel 11 by the driver, even if the final slip gain Ksd for finally correcting the assist torque Ta is set to the slip gain Ks and the output (recovery) of the slip gain Ks is permitted. As a result, the driver feels no unnatural sensation.

On the other hand, if the assist torque Ta received from the assist torque determination section 62 of the assist torque computation section 60 is not "0" (i.e., the estimative axial force Fc is equal to or greater than the target steering torque Th; in other words, the determined assist torque Ta is set to be greater than "0" because the estimative steering angle $\theta c$ of the left and right front wheels WfL and WfR (steerable wheels) is large), the slip gain recovery determination section 65 determines "No" in step S13, and executes step S14 repeatedly.

In step S14, the slip gain recovery determination section 65 prohibits the output (recovery) of the slip gain Ks determined by the slip gain determination section 64, and sets the final slip gain Ksd to "0". That is, in this case, although the rotating state of the wheel has changed from the complete slip state to the slip recovery state, an assist torque Ta which is greater than "0" is determined by the assist torque determination section 62.

Therefore, for example, if the final slip gain Ksd is set to the slip gain Ks determined by the slip gain determination section 64, unexpected steering (excessive assist or self-steering) of the left and right front wheels WfL and WfR is likely to occur due to sudden application of the corrected assist torque Tad, and the driver may have unnatural sensation by sensing the corrected assist torque Tad applied via the steering wheel 11. Accordingly, the slip gain recovery determination section 65 sets (maintains) the final slip gain Ksd to (at) "0" to prevent the corrected assist torque Tad from being applied suddenly.

On the other hand, if a "No" determination is made in the above-described step S11, the slip gain recovery determination section 65 proceeds to step S15 so as to set the final slip gain Ksd to the slip gain Ks. That is, in this case, as mentioned above, the rotating state of the wheel has not changed from the complete slip state to the slip recovery state. Accordingly, in this case, the slip gain recovery determination section 65 sets the final slip gain Ksd to the slip gain Ks and permits the output (recovery) of the slip gain Ks.

Upon completion of execution of the above-described step S13 or S15, the slip gain recovery determination section 65 proceeds to step S16 to terminate execution of the slip gain recovery determination program temporarily.

After the final slip gain Ksd is set by the slip gain recovery determination section 65, the assist torque correction section 63 computes a finally corrected assist torque Tad by multiplying the assist torque Ta received from the assist torque determination section 62 by the final slip gain Ksd.

Figure 17:
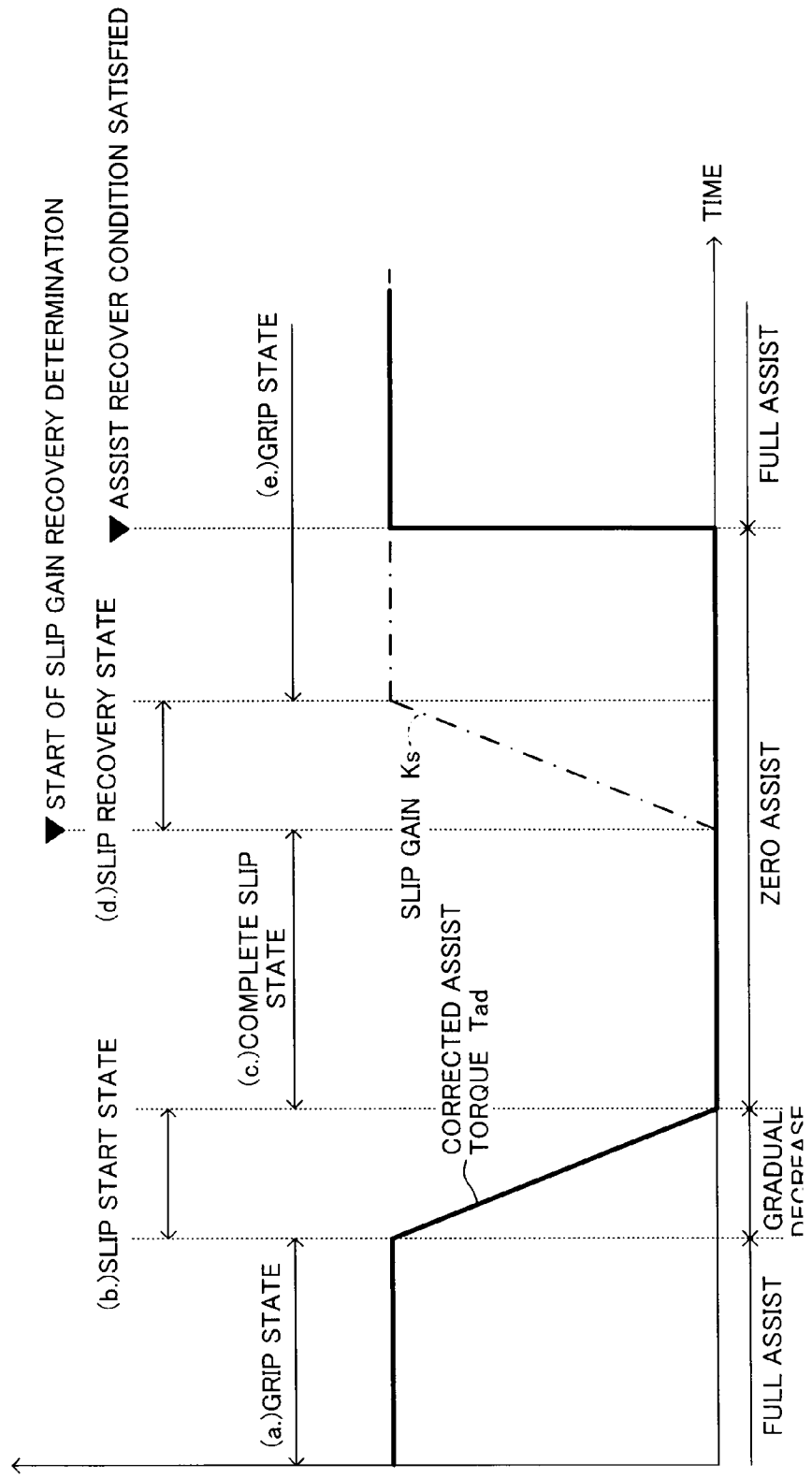
FIG. 17 is a time chart for describing changes in slip gain and corrected assist torque.

FIG. 17 shows the timings of the above-described determination of the final slip gain Ksd and the above-described computation of the corrected assist torque Tad. Specifically, in a (a.) grip state, extremely minor slip is occurring on at least one of the left and right front wheels WfL and WfR and the left and right rear wheels WrL and WrR. Therefore, in this (a.) grip state, the slip gain recovery determination section 65 executes the above-described steps S11 and S15 of the slip gain recovery determination program so as to set the final slip gain Ksd to the slip gain Ks. Accordingly, in this case, since the corrected assist torque Tad; namely, the slip gain Ks is "1", there is established a full assist state in which the assist torque Ta is applied.

In a (b.) slip start state changed from the above-described (a.) grip state, slippage of a relatively large slip ratio is occurring on at least one of the left and right front wheels WfL and WfR and the left and right rear wheels WrL and WrR. Accordingly, the slip gain recovery determination section 65 executes the above-described steps S11 and S15 of the slip gain recovery determination program so as to set the final slip gain Ksd to the slip gain Ks. Thus, the final slip gain Ksd decreases toward the lower limit value "0" with a decrease in the slip gain Ks. Accordingly, the corrected assist torque Tad gradually decreases toward "0".

In a (c.) complete slip state changed from the above-described (b.) slip start state, complete slippage with a slip ratio of "1" is occurring on at least one of the left and right front wheels WfL and WfR and the left and right rear wheels WrL and WrR. Accordingly, the slip gain recovery determination section 65 executes the above-described steps S11 and S15 of the slip gain recovery determination program so as to set the final slip gain Ksd to the slip gain Ks. Accordingly, in this case, since the slip gain Ks is "0", the corrected assist torque Tad becomes "0", and there is established a zero assist state in which no torque is applied.

In the (d.) slip recovery state changed from the (c.) complete slip state, as indicated by an alternate long and short dash line, the slip gain determination section 64 determines the slip gain Ks such that the slip gain Ks increases from the lower limit value "0" toward the upper limit value "1" as the estimative steering angle difference Δθ decreases. Subsequently, in the above-described step S11 of the slip gain recovery determination program, the slip gain recovery determination section 65 starts slip gain recovery determination (determination as to whether or not the rotating state of the wheel has changed from the complete slip state to the slip recovery state).

Notably, if the assist torque Ta determined by the assist torque determination section 62 is not "0" in the above-described situation, the slip gain recovery determination section 65 prohibits the output (recovery) of the slip gain Ks determined by the slip gain determination section 64, and sets the final slip gain Ksd to "0" (this processing corresponds to steps S11, S12, and S14). Thus, as indicated by a thick solid line, the zero assist state is maintained with no corrected assist torque Tad applied. In the (e.) grip state changed from the (d.) slip recovery state, the slip gain Ks is set at "1". However, if the assist torque Ta determined by the assist torque determination section 62 is not "0", the slip gain recovery determination section 65 maintains the final slip gain Ksd at "0" continuously (this processing corresponds to steps S11, S12, and S14). Accordingly, the corrected assist torque Tad is not applied, and the zero assist state is maintained.

Furthermore, when the assist torque Ta determined with time by the assist torque determination section 62 becomes "0" with elapse of time in the (e.) grip state, the slip gain recovery determination section 65 sets the final slip gain Ksd to the slip gain Ks (this processing corresponds to steps S11, S12, and S13). Accordingly, in the case where the assist recovery condition is satisfied as a result of the assist torque Ta becoming "0" in the (e.) grip state and the computed assist torque Ta then becomes greater than "0", since the slip gain Ks has been set to "1", there is established a full assist state in which the assist torque Ta is applied as a corrected assist torque Tad.

Upon completion of computation of the corrected assist torque Tad as mentioned above, the electronic control unit 35 supplies a drive current corresponding to the corrected assist torque Tad to the electric motor 25 via the drive circuit 36. This allows the electric motor 25 to transmit a torque corresponding to the corrected assist torque Tad (or the assist torque Ta) via the rack bar 22. Accordingly, the driver can turn the steering wheel 11 with the target steering torque Th, and have good steering feeling.

As is understood from the above description, in the present embodiment, if an anomaly occurs in the steering torque sensor 32, the steering angle estimation section 40 can compute a front-wheel-side estimative steering angle θFr and a rear-wheel-side estimative steering angle θRr by performing low-pass filter processing for the signals which are received from the wheel speed sensors 31a to 31d and represent the wheel speeds ωfL, ωfR, ωrL, and ωrR of the left and right front wheels WfL and WfR and the left and right rear wheels WrL and WrR. In addition, the steering angle estimation section 40 can compute an accurate estimative steering angle θc by averaging the front-wheel-side estimative steering angle θFr and the rear-wheel-side estimative steering angle θRr. Moreover, the steering angle estimation section 40 can obtain an accurate estimative steering angle difference Δθ by computing the difference between the front-wheel-side estimative steering angle θFr and the rear-wheel-side estimative steering angle θRr.

Meanwhile, the axial force estimation section 50 can compute a base axial force Fb through use of the accurate estimative steering angle θc computed by the steering angle estimation section 40 and the vehicle speed V. In addition, the axial force estimation section 50 can compute a correction axial force Fa for providing a hysteresis characteristic for the base axial force Fb in accordance with the driver's operation of turning or returning the steering wheel 11. Furthermore, the axial force estimation section 50 can compute an accurate estimative axial force Fc by adding the base axial force Fb and the correction axial force Fa together.

Moreover, the assist torque computation section 60 can compute an assist torque Ta by comparing the target steering torque Th which changes with the vehicle speed V with the accurate estimative axial force Fc computed by the axial force estimation section 50, and subtracting the target steering torque Th from the estimative axial force Fc. In addition, the assist torque computation section 60 can compute a corrected assist torque Tad by correcting the assist torque Ta in accordance with the rotating state (i.e., whether or not slippage is occurring) of the left and right front wheels WfL and WfR and the left and right rear wheels WrL and WrR.

The electronic control unit 35 controls the drive circuit 36 so as to cause the electric motor 25 to output a corrected assist torque Tad (assist torque Ta). Thus, the corrected assist torque Tad (assist torque Ta) can be applied to the turning operation of the steering wheel 11 performed by the driver.

As mentioned above, in the vehicular electric power steering apparatus according to the present embodiment, the estimative steering angle θc of the left and right front wheels WfL and WfR and the estimative axial force Fc applied to the rack bar 22 of the steering gear unit 20 can be estimated accurately even when an anomaly occurs in the steering torque sensor 32. Accordingly, even when an anomaly occurs in the steering torque sensor 32, an appropriate corrected assist torque Tad (assist torque Ta) can be determined accurately through use of a simplified configuration, without using, as the steering torque sensor 32, a steering torque sensor having a redundant configuration. Moreover, an appropriate corrected assist torque Tad (assist torque Ta) can be continuously applied to the turning operation of the steering wheel 11 performed by the driver. Accordingly, the burden imposed on the driver when he or she turns the steering wheel 11 can be reduced drastically.

The present invention is not limited to the above-described embodiment, and may be modified in various manners without departing from the scope of the present invention.

For example, the above-described embodiment is configured such that the axial force estimation section 50 includes the steering responsive axial force correction section 54. However, the steering responsive axial force correction section 54 may be omitted in order to reliably notify the driver of an anomaly occurred in the steering torque sensor 32. In the case where the steering responsive axial force correction section 54 is omitted, the estimative axial force Fc is determined on the basis of only the base axial force Fb determined by the base axial force computation section 51 of the axial force estimation section 50. Consequently, as mentioned above, the driver senses a torque change while turning or returning the steering wheel 11, and feels unnatural sensation. In other words, the driver can be effectively notified of occurrence of abnormal operation of the electric power steering apparatus by feeling the unnatural sensation. Notably, even in this case, the assist torque Ta can be applied continuously in a situation where an anomaly has occurred in the steering torque sensor 32.

In the above-described embodiment, the assist torque computation section 60 includes the assist torque correction section 63. However, for example, in the case where slippage of the left and right front wheels WfL and WfR and the left and right rear wheels WrL and WrR is restrained by another apparatus installed in the vehicle, the assist torque correction section 63 may be omitted. Even in the case where the assist torque correction section 63 is omitted, the assist torque determination section 62 of the assist torque computation section 60 can determine an appropriate assist torque Ta. In addition, since slippage of the left and right front wheels WfL and WfR and the left and right rear wheels WrL and WrR is restrained by another apparatus, even when the assist torque Ta is applied, excessive assist or self-steering can be prevented. Accordingly, even in this case, the assist torque Ta can be applied continuously in a situation where an anomaly has occurred in the steering torque sensor 32.

In the above-described embodiment, the LPF processing section 41 of the steering angle estimation section 40 performs appropriate low-pass filter processing for the signals representing the wheel speeds ωfL, ωfR, ωrL, and ωrR using the cutoff frequency T(|Θ'|) which changes with the steering speed (specifically, the motor rotational angular speed Θ'). In this case, instead of using the cutoff frequency T(|Θ'|) which changes with the steering speed (specifically, the motor rotational angular speed Θ'), the low-pass filter processing can be performed with the cutoff frequency fixed. In this case, the cutoff frequency may be fixed to, for example, a frequency between the lower-limit-side cutoff frequency T0 and the upper-limit-side cutoff frequency T1 adopted in the above-described embodiment. In such a case, an inexpensive low-pass filter processing section of a simpler structure can be configured although the performance of reducing phase delay and removing high-frequency noise components is slightly poor as compared with the above-described embodiment. Therefore, effects similar to those of the above-described embodiment are expected, and the assist torque Ta can be continuously applied in a situation where an anomaly has occurred in the steering torque sensor 32.

In the above-described embodiment, a well-known brushless motor is used as the electric motor 25, and the motor rotational angle sensor 33 detects the rotational angle Θ of the electric motor 25. In the case where a well-known brushed motor is used as the electric motor 25, the embodiment may be configured such that a counter electromotive force output from the brushed motor to the drive circuit 36 is detected, and the rotational angle Θ of the electric motor 25 is detected in accordance with the magnitude of the counter electromotive force. Even in this case, since the motor rotational angle Θ can be used as in the case of the above-described embodiment, the assist torque Ta can be continuously applied in a situation where an anomaly has occurred in the steering torque sensor 32.

In the above-described embodiment, the electric power steering apparatus is of a rack-assist-type; i.e., the electric motor 25 is mounted to the steering gear unit 20 and transmits a torque corresponding to the assist torque Ta (corrected assist torque Tad) to the rack bar 22. In this case, needless to say, the electric power steering apparatus may be of a column assist type configured such that the electric motor 25 transmits torque to the steering shaft 12 or a pinion assist type configured such that the electric motor 25 transmits torque to an unillustrated pinion shaft. As mentioned above, even in the case where the electric power steering apparatus is of a column assist type or a pinion assist type, the assist torque Ta can be continuously applied in a situation where an anomaly has occurred in the steering torque sensor 32.

The invention claimed is:

1. An electric power steering apparatus for a vehicle which includes operation force detection means for detecting operation force which is input by a driver so as to steer steerable wheels of the vehicle through rotation operation of a steering wheel; an electric motor for generating assist force so as to assist the rotation operation of the steering wheel by the driver; and control means for controlling operation of the electric motor on the basis of an assist force corresponding to the operation force detected by the operation force detection means, the control means comprising:

vehicle speed detection means for detecting speed of the vehicle;

wheel speed detection means provided for each of front-side left and right wheels and rear-side left and right wheels of the vehicle for detecting speed of the corresponding wheel;

anomaly detection means for detecting an anomaly of the operation force detection means;

steering angle estimation means, operable when the anomaly detection means has detected an anomaly of the operation force detection means, for computing a first steering angle of the steerable wheels through use of the speeds of the front-side left and right wheels among those detected by the wheel speed detection means, computing a second steering angle of the steerable wheels through use of the speeds of the rear-side left and right wheels among those detected by the wheel speed detection means, and estimating the steering angle of the steerable wheels at the time when the vehicle is turning, through use of the first and second steering angles;

axial force estimation means for estimating an axial force through use of the steering angle estimated by the steering angle estimation means and the vehicle speed detected by the vehicle speed detection means, the axial force having a predetermined relation with the steering angle of the steerable wheels and the vehicle speed, and being input to a steering mechanism which steers the steerable wheels of the vehicle;

assist force computation means for determining a target steering force through use of the vehicle speed detected by the vehicle speed detection means, the target steering force having a predetermined relation with the vehicle speed and being input by the driver via the steering wheel, and for computing the assist force for assisting the rotation operation of the steering wheel by the driver, through use of the determined target steering force and the axial force estimated by the axial force estimation means;

operation control means for controlling operation of the electric motor on the basis of the assist force computed by the assist force computation means; and operation speed detection means for detecting a rotational operation speed of the steering wheel, wherein the steering angle estimation means includes filter processing means for performing low-pass filter processing for the speeds of the wheels detected by the wheel speed detection means, the low-pass filter processing having a predetermined cutoff frequency, and the filter processing means performs the low-pass filter processing for the speeds of the wheels detected by the wheel speed detection means, while increasing the cutoff frequency as the rotational operation speed detected by the operation speed detection means increases, and decreasing the cutoff frequency as the detected rotational operation speed decreases.

2. An electric power steering apparatus for a vehicle according to claim 1, wherein the operation speed detection means detects a rotational speed of the electric motor, and detects the rotational operation speed of the steering wheel through use of the detected rotational speed of the electric motor.

3. An electric power steering apparatus for a vehicle according to claim 1, wherein the steering angle estimation means computes the first and second steering angles of the steerable wheels through use of an overall gear ratio of the vehicle, which represents the ratio of the detected steering angle to the actual steering angle of the steerable wheels of the vehicle and which is set in advance through an experiment.

4. An electric power steering apparatus for a vehicle according to claim 1, wherein the steering angle estimation means estimates the steering angle of the steerable wheels at the time when the vehicle is turning by averaging a first steering angle of the steerable wheels computed through use of a difference between the speeds of the front-side left and right wheels among those detected by the wheel speed detection means, and a second steering angle of the steerable wheels computed through use of a difference between the speeds of the rear-side left and right wheels among those detected by the wheel speed detection means.

5. An electric power steering apparatus for a vehicle according to claim 1, wherein, when the vehicle speed detected by the vehicle speed detection means is equal to or lower than a previously set speed, the steering angle estimation means sets the computed first and second steering angles of the steerable wheels to "0".

6. An electric power steering apparatus for a vehicle according to claim 1, wherein
the axial force estimation means includes correction assist force computation means for computing a correction axial force through use of the rotational operation speed detected by the operation speed detection means and the vehicle speed detected by the vehicle speed detection means, the correction axial force having a predetermined relation with the rotational operation speed of the steering wheel and the vehicle speed and being used for correcting the estimated axial force.

7. An electric power steering apparatus for a vehicle according to claim 6, wherein
of the relations among the rotational operation speed of the steering wheel, the vehicle speed, and the correction axial force, at least the relation between the rotational operation speed of the steering wheel and the correction axial force is determined such that, when the rotational operation speed of the steering wheel is less than a previously set first rotational operation speed, the correction axial force increases as the rotational operation speed of the steering wheel increases, and, when the rotational operation speed of the steering wheel is equal to or greater than a previously set second rotational operation speed greater than the first rotational operation speed, the correction axial force decreases as the rotational operation speed of the steering wheel increases; and
the correction axial force computation means computes the correction axial force on the basis of the previously determined relation through use of the rotational operation speed detected by the operation speed detection means.

8. An electric power steering apparatus for a vehicle according to claim 6, wherein
of the relations among the rotational operation speed of the steering wheel, the vehicle speed, and the correction axial force, at least the relation between the vehicle speed and the correction axial force is determined such that the correction axial force decreases toward a predetermined level as the vehicle speed increases; and
the correction axial force computation means computes the correction axial force on the basis of the previously determined relation through use of the vehicle speed detected by the vehicle speed detection means.

9. An electric power steering apparatus for a vehicle according to claim 1, wherein the assist force computation means compares the absolute value of the determined target steering force and the absolute value of the axial force estimated by the axial force estimation means, sets the assist force to "0" when the absolute value of the estimated axial force is equal to or less than the absolute value of the target steering force, and computes the assist force by subtracting the target steering force from the estimated axial force when the absolute value of the estimated axial force is greater than the absolute value of the target steering force.

10. An electric power steering apparatus for a vehicle according to claim 9, wherein the assist force computation means determines the target steering force such that, when the vehicle speed detected by the vehicle speed detection means is less than a previously set, predetermined vehicle speed, the absolute value of the target steering force increases as the detected vehicle speed increases, and, when the detected vehicle speed is equal to or greater than the previously set, predetermined vehicle speed, the absolute value of the target steering force is maintained constant irrespective of the detected vehicle speed.

11. An electric power steering apparatus for a vehicle according to claim 1, wherein
the steering angle estimation means computes a steering angle difference which represents the difference between the first and second steering angles which increases and decreases in accordance with the state of slippage which has occurred at any of the front-side left and right wheels and the rear-side left and right wheels; and
the assist force computation means includes assist force correction means for correcting the computed assist force on the basis of the magnitude of the steering angle difference computed by the steering angle estimation means and in accordance with the state of the slippage which has occurred at any of the front-side left and right wheels and the rear-side left and right wheels.

12. An electric power steering apparatus for a vehicle according to claim 11, wherein
the assist force correction means includes slip gain determination means for determining, through use of the steering angle difference computed by the steering angle estimation means, a slip gain for correcting the magnitude of the assist force computed by the assist force computation means in accordance with the state of slippage having occurred at any one of the front-side left and right wheels and the rear-side left and right wheels, the slip gain determination means determining the slip gain such that the slip gain decreases when the computed steering angle difference is equal to or greater than a previously set first steering angle difference, and the slip gain becomes zero when the computed steering angle difference is equal to or greater than a previously set second steering angle difference greater than the first steering angle difference; and corrected assist force computation means for computing a corrected assist force by multiplying the computed assist force by the slip gain determined by the slip gain determination means.

13. An electric power steering apparatus for a vehicle according to claim 12, wherein the assist force correction means includes slip gain recovery determination means, wherein if the assist force computed by the assist force computation means is not "0" when the steering angle difference computed by the steering angle estimation means becomes less than the second steering angle difference, the slip gain recovery determination means prohibits the slip gain, which is determined by the slip gain determination means through use of the computed steering angle difference, from becoming greater than "0" to thereby maintain the slip gain at "0", and if the assist force computed by the assist force computation means is "0" when the steering angle difference computed by the steering angle estimation means becomes less than the second steering angle difference, the slip gain recovery determination means permits the slip gain, which is determined by the slip gain determination means through use of the computed steering angle difference, from recovering and becoming greater than "0".

* * * * *